United States Patent
Matsumura et al.

(10) Patent No.: US 12,490,273 B2
(45) Date of Patent: Dec. 2, 2025

(54) TERMINAL, RADIO COMMUNICATION METHOD, AND BASE STATION FOR DETERMINING QUASI-CO-LOCATION PARAMETERS

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 17/911,300

(22) PCT Filed: Mar. 19, 2020

(86) PCT No.: PCT/JP2020/012503
§ 371 (c)(1),
(2) Date: Sep. 13, 2022

(87) PCT Pub. No.: WO2021/186724
PCT Pub. Date: Sep. 23, 2021

(65) Prior Publication Data
US 2023/0115642 A1 Apr. 13, 2023

(51) Int. Cl.
*H04W 72/23* (2023.01)
*H04L 5/00* (2006.01)

(52) U.S. Cl.
CPC ............. *H04W 72/23* (2023.01); *H04L 5/001* (2013.01)

(58) Field of Classification Search
CPC . H04W 72/1273; H04W 72/20; H04W 72/23; H04W 72/231–232; H04L 5/001
(Continued)

(56) References Cited

U.S. PATENT DOCUMENTS

2019/0260524 A1* 8/2019 Nam ................. H04L 5/0023
2019/0281587 A1 9/2019 Zhang et al.
(Continued)

FOREIGN PATENT DOCUMENTS

WO WO-2019153347 A1 * 8/2019 ........... H04B 7/0695

OTHER PUBLICATIONS

Office Action issued in counterpart Japanese Application No. 2022-508009, mailed Apr. 16, 2024 (6 pages).
(Continued)

*Primary Examiner* — Kevin C. Harper
(74) *Attorney, Agent, or Firm* — Osha Bergman Watanabe & Burton

(57) ABSTRACT

A terminal according to an aspect of the present disclosure includes: a receiving section that receives at least one of first information relating to a physical downlink shared channel (PDSCH) and second information relating to an uplink signal; and a control section that uses, when the first information satisfies a first condition, a first Quasi-Co-Location (QCL) parameter for receiving the PDSCH, instead of a QCL parameter indicated for the PDSCH, and uses, when the second information satisfies a second condition, a second QCL parameter for transmitting the uplink signal, instead of a QCL parameter indicated for the uplink signal, in which the first QCL parameter and the second QCL parameter are equal. According to an aspect of the present disclosure, QCL parameters can be appropriately determined.

7 Claims, 12 Drawing Sheets

| CHANNEL/RS | RS USED FOR BEAM | CONDITION |
|---|---|---|
| PDSCH | IF SPECIFIC MAC CE IS NOT INDICATED, EXISTING DEFAULT TCI STATE/QCL OR DEFAULT TCL STATE/QCL BASED ON FIRST EMBODIMENT. OTHERWISE, TCI STATE DERIVED FROM SPECIFIC MAC CE. | CASE THAT OFFSET BETWEEN RECEPTION OF DL DCI AND PDSCH IS SHORTER THAN THRESHOLD VALUE. |
| PUSCH SCHEDULED BY DCI FORMAT 0_1 | | CASE THAT SRS RESOURCE CORRESPONDING TO SRI DOES NOT HAVE SPATIAL RELATION/PL-RS. |
| PUSCH SCHEDULED BY DCI FORMAT 0_0 | IF CORESET IS CONFIGURED IN ACTIVE DL BWP ON CORRESPONDING CC, TCI STATE OF LOWEST CORESET ID. OTHERWISE, ACTIVE TCI STATE WITH LOWEST ID OF PDSCH IN ACTIVE DL BWP ON CORRESPONDING CC. | CASE THAT ACTIVE PUCCH SPATIAL RELATION DOES NOT EXIST OR PUCCH RESOURCE DOES NOT EXIST ON ACTIVE UL IN CC. |
| PUCCH | | CASE THAT PUCCH RESOURCE DOES NOT HAVE SPATIAL RELATION/PL-RS. |
| SRS | | CASE THAT SRS RESOURCE DOES NOT HAVE SPATIAL RELATION/PL-RS. |

(58) Field of Classification Search
USPC .......................................................... 370/329
See application file for complete search history.

(56) References Cited

U.S. PATENT DOCUMENTS

| | | | |
|---|---|---|---|
| 2020/0337058 A1* | 10/2020 | Song | H04L 5/10 |
| 2021/0105805 A1* | 4/2021 | Venugopal | H04W 72/046 |
| 2021/0119741 A1* | 4/2021 | Zhou | H04L 5/0094 |
| 2021/0258946 A1* | 8/2021 | Cheng | H04W 72/51 |
| 2022/0086892 A1* | 3/2022 | Kang | H04B 7/0628 |
| 2022/0116177 A1* | 4/2022 | Shi | H04L 5/0055 |
| 2022/0386332 A1* | 12/2022 | Yokomakura | H04W 72/23 |

OTHER PUBLICATIONS

3GPP TSG-RAN WG1 Meeting #98bis; R1-1911143 "Default PDSCH beam decoupled from PDCCH beam" Qualcomm Incorporated; Chongqing, China; Oct. 14-20, 2019 (2 pages).

3GPP TSG-RAN WG1 Meeting #94; R1- 1809711 "Beam management for NR" Qualcomm Incorporated; Gothenburg, Sweden; Aug. 20-24, 2018 (16 pages).

Extended European Search Report issued in European Application No. 20925175.0, dated Nov. 24, 2023 (9 pages).

Office Action issued in Japanese Application No. 2022-508009; Dated Dec. 12, 2023 (6 pages).

International Search Report issued in PCT/JP2020/012503 on Oct. 13, 2020 (1 page).

Written Opinion of the International Searching Authority issued in PCT/JP2020/012503 on Oct. 13, 2020 (3 pages).

Huawei, HiSilicon; "Feature Summary of Enhancements on Multi-TRP/Panel Transmission"; 3GPP TSG RAN WG1 Meeting #99, R1-1913299; Reno, USA; Nov. 18-22, 2019 (87 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| CHANNEL/RS | RS USED FOR BEAM | CONDITION |
|---|---|---|
| PDSCH | IF NON-CROSS CARRIER SCHEDULING, TCI STATE OF LOWEST CORESET ID IN LATEST SLOT IN ACTIVE DL BWP OF CORRESPONDING CC. OTHERWISE, ACTIVE TCI STATE WITH LOWEST ID OF PDSCH IN ACTIVE DL BWP OF SCHEDULED CC. | CASE THAT OFFSET BETWEEN RECEPTION OF DL DCI AND PDSCH IS SHORTER THAN THRESHOLD VALUE. |
| PUSCH SCHEDULED BY DCI FORMAT 0_1 | | CASE THAT SRS RESOURCE CORRESPONDING TO SRI DOES NOT HAVE SPATIAL RELATION/PL-RS. |
| PUSCH SCHEDULED BY DCI FORMAT 0_0 | IF CORESET IS CONFIGURED IN ACTIVE DL BWP ON CORRESPONDING CC, TCI STATE OF LOWEST CORESET ID. OTHERWISE, ACTIVE TCI STATE WITH LOWEST ID OF PDSCH IN ACTIVE DL BWP ON CORRESPONDING CC. | CASE THAT ACTIVE PUCCH SPATIAL RELATION DOES NOT EXIST OR PUCCH RESOURCE DOES NOT EXIST ON ACTIVE UL IN CC. |
| PUCCH | | CASE THAT PUCCH RESOURCE DOES NOT HAVE SPATIAL RELATION/PL-RS. |
| SRS | | CASE THAT SRS RESOURCE DOES NOT HAVE SPATIAL RELATION/PL-RS. |

FIG. 3

| CHANNEL/RS | RS USED FOR BEAM | CONDITION |
|---|---|---|
| PDSCH | | CASE THAT OFFSET BETWEEN RECEPTION OF DL DCI AND PDSCH IS SHORTER THAN THRESHOLD VALUE. |
| PUSCH SCHEDULED BY DCI FORMAT 0_1 | IF CORESET IS CONFIGURED IN ACTIVE DL BWP ON CORRESPONDING CC, TCI STATE OF LOWEST CORESET ID. OTHERWISE, ACTIVE TCI STATE WITH LOWEST ID OF PDSCH IN ACTIVE DL BWP ON CORRESPONDING CC. | CASE THAT SRS RESOURCE CORRESPONDING TO SRI DOES NOT HAVE SPATIAL RELATION/PL-RS. |
| PUSCH SCHEDULED BY DCI FORMAT 0_0 | | CASE THAT ACTIVE PUCCH SPATIAL RELATION DOES NOT EXIST OR PUCCH RESOURCE DOES NOT EXIST ON ACTIVE UL IN CC. |
| PUCCH | | CASE THAT PUCCH RESOURCE DOES NOT HAVE SPATIAL RELATION/PL-RS. |
| SRS | | CASE THAT SRS RESOURCE DOES NOT HAVE SPATIAL RELATION/PL-RS. |

FIG. 4

| CHANNEL/RS | RS USED FOR BEAM | CONDITION |
|---|---|---|
| PDSCH | | CASE THAT OFFSET BETWEEN RECEPTION OF DL DCI AND PDSCH IS SHORTER THAN THRESHOLD VALUE. |
| PUSCH SCHEDULED BY DCI FORMAT 0_1 | | CASE THAT SRS RESOURCE CORRESPONDING TO SRI DOES NOT HAVE SPATIAL RELATION/PL-RS. |
| PUSCH SCHEDULED BY DCI FORMAT 0_0 | IF NON-CROSS CARRIER SCHEDULING, TCI STATE OF LOWEST CORESET ID IN LATEST SLOT IN ACTIVE DL BWP OF CORRESPONDING CC. OTHERWISE, ACTIVE TCI STATE WITH LOWEST ID OF PDSCH IN ACTIVE DL BWP OF SCHEDULED CC. | CASE THAT ACTIVE PUCCH SPATIAL RELATION DOES NOT EXIST OR PUCCH RESOURCE DOES NOT EXIST ON ACTIVE UL IN CC. |
| PUCCH | | CASE THAT PUCCH RESOURCE DOES NOT HAVE SPATIAL RELATION/PL-RS. |
| SRS | | CASE THAT SRS RESOURCE DOES NOT HAVE SPATIAL RELATION/PL-RS. |

FIG. 5

| CHANNEL/RS | RS USED FOR BEAM | CONDITION |
|---|---|---|
| PDSCH | IF SPECIFIC MAC CE IS NOT INDICATED, EXISTING DEFAULT TCI STATE/QCL OR DEFAULT TCL STATE/QCL BASED ON FIRST EMBODIMENT. OTHERWISE, TCI STATE DERIVED FROM SPECIFIC MAC CE. | CASE THAT OFFSET BETWEEN RECEPTION OF DL DCI AND PDSCH IS SHORTER THAN THRESHOLD VALUE. |
| PUSCH SCHEDULED BY DCI FORMAT 0_1 | | CASE THAT SRS RESOURCE CORRESPONDING TO SRI DOES NOT HAVE SPATIAL RELATION/PL-RS. |
| PUSCH SCHEDULED BY DCI FORMAT 0_0 | IF CORESET IS CONFIGURED IN ACTIVE DL BWP ON CORRESPONDING CC, TCI STATE OF LOWEST CORESET ID. OTHERWISE, ACTIVE TCI STATE WITH LOWEST ID OF PDSCH IN ACTIVE DL BWP ON CORRESPONDING CC. | CASE THAT ACTIVE PUCCH SPATIAL RELATION DOES NOT EXIST OR PUCCH RESOURCE DOES NOT EXIST ON ACTIVE UL IN CC. |
| PUCCH | | CASE THAT PUCCH RESOURCE DOES NOT HAVE SPATIAL RELATION/PL-RS. |
| SRS | | CASE THAT SRS RESOURCE DOES NOT HAVE SPATIAL RELATION/PL-RS. |

FIG. 6

TERMINAL, RADIO COMMUNICATION METHOD, AND BASE STATION FOR DETERMINING QUASI-CO-LOCATION PARAMETERS

TECHNICAL FIELD

The present disclosure relates to a user terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems to LTE (for example, referred to as 5th generation mobile communication system (5G), 5G+ (plus), 6th generation mobile communication system (6G), New Radio (NR), 3GPP Rel. 15 or later, and the like) are also under study.

In existing LTE systems (for example, 3GPP Rel. 8 to 14), a user terminal (User Equipment (UE)) transmits uplink control information (Uplink Control Information (UCI)) using at least one of a UL data channel (for example, Physical Uplink Shared Channel (PUSCH)) and a UL control channel (for example, Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is under study that, in a future radio communication system (for example, NR), a user terminal (a terminal, User Equipment (UE)) will control transmission/reception processing, based on information relating to Quasi-Co-Location (Quasi-Co-Location (QCL)).

However, there is a case where a QCL parameter used for receiving a downlink signal and a QCL parameter used for transmitting an uplink signal are different. In determining these QCL parameters, there is a risk that a system performance will deteriorate, such as complication of a UE operation or reduction of throughput.

Therefore, it is an object of the present disclosure to provide a terminal, a radio communication method, and a base station that appropriately determine QCL parameters.

Solution to Problem

A terminal according to an aspect of the present disclosure includes: a receiving section that receives at least one of first information relating to a physical downlink shared channel (PDSCH) and second information relating to an uplink signal; and a control section that uses, when the first information satisfies a first condition, a first Quasi-Co-Location (QCL) parameter for receiving the PDSCH, instead of a QCL parameter indicated for the PDSCH, and uses, when the second information satisfies a second condition, a second QCL parameter for transmitting the uplink signal, instead of a QCL parameter indicated for the uplink signal, in which the first QCL parameter and the second QCL parameter are equal.

Advantageous Effects of Invention

According to an aspect of the present disclosure, QCL parameters can be appropriately determined.

BRIEF DESCRIPTION OF DRAWINGS

FIG. 3 is a diagram to show examples of DL and UL default beams;

FIG. 4 is a diagram to show examples of DL and UL default beams according to a first embodiment;

FIG. 5 is a diagram to show examples of DL and UL default beams according to a second embodiment;

FIG. 6 is a diagram to show an example of DL and UL default beams according to a third embodiment;

DESCRIPTION OF EMBODIMENTS (Multi-TRP)

It is being considered, in NR, one or a plurality of transmission/reception points (TRP) (multi-TRP) use one or a plurality of panels (multi-panel) to perform DL transmission to UE. It is also being considered that UE performs UL transmission to one or a plurality of TRPs.

Note that the plurality of TRPs may correspond to the same cell Identifier (ID) or may correspond to different cell IDs. The cell ID may be a physical cell ID or a virtual cell ID.

FIGS. 1A-1D are diagrams to show examples of multi-TRP scenarios. In these examples, it is assumed that each TRP is capable of transmitting four different beams, without limitation to this.

Figure 1A:
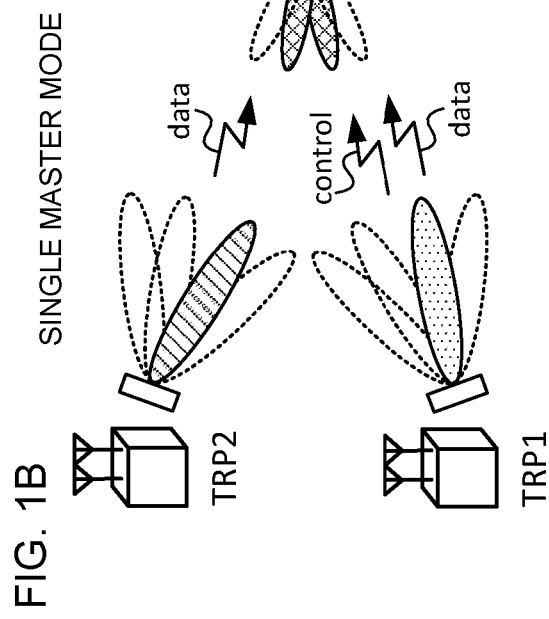
FIGS. 1A to 1D are diagrams to show examples of multi-TRP scenarios.

FIG. 1A shows an example of a case where only one TRP (TRP1 in this example) of multi TRPs transmits to UE (which may also be referred to as a single mode, a single TRP, or the like). In this case, the TRP1 transmits both control signal (PDCCH) and data signal (PDSCH) to the UE.

Figure 1B:
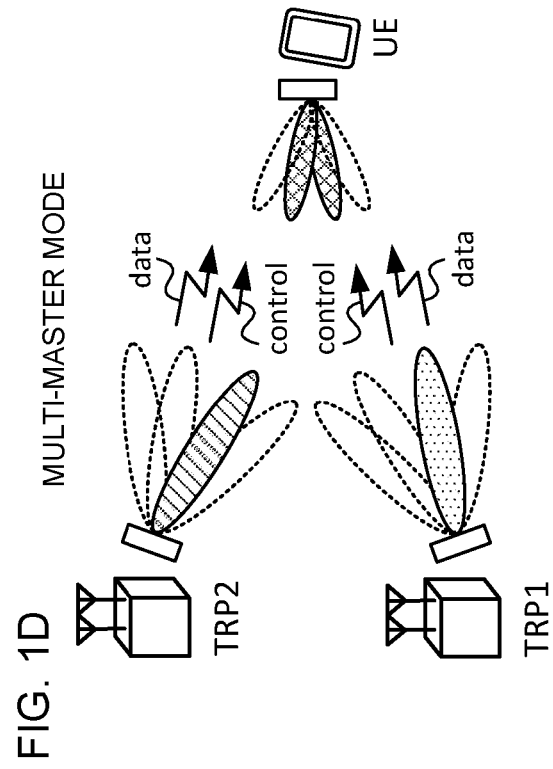

FIG. 1B shows an example of a case where only one TRP (TRP1 in this example) of multi TRPs transmits a control signal to UE, and the multi TRPs transmit data signals (which may also be referred to as a single master mode). The UE receives each PDSCH transmitted from the multi TRPs, based on one piece of downlink control information (DCI).

Figure 1C:
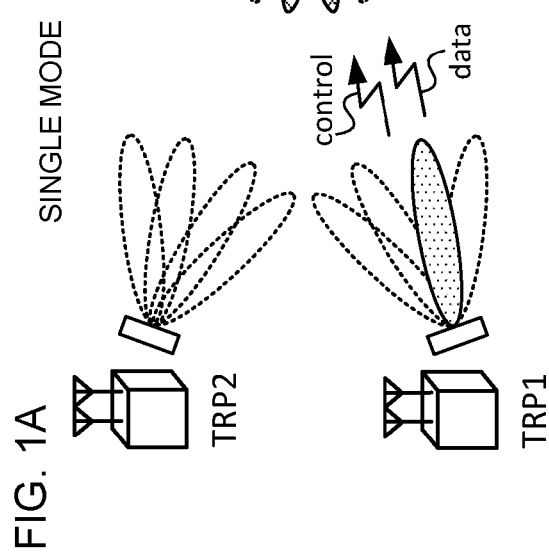

FIG. 1C shows an example of a case where each TRP of multi TRPs transmits a part of a control signal to UE and the multi TRPs transmit data signals (which may also be referred to as a master-slave mode). TRP1 may transmit part 1 of the control signal (DCI), and TRP2 may transmit part 2 of the control signal (DCI). Part 2 of the control signal may depend on Part 1. The UE receives each PDSCH transmitted from the multi TRPs, based on these DCI parts.

Figure 1D:
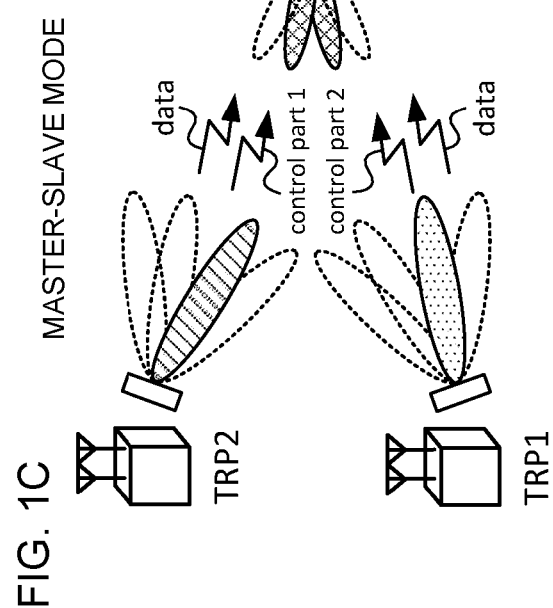

FIG. 1D shows an example of a case where each TRP of multi TRPs transmits an individual control signal to UE and the multi TRPs transmit data signals (which may also be referred to as a multi-master mode). TRP1 may transmit a first control signal (DCI), and TRP2 may transmit a second control signal (DCI). Based on these pieces of DCI, the UE receives each PDSCH transmitted from the multi TRPs.

When a plurality of PDSCHs from multi TRPs (which may also be referred to as multiple PDSCHs) are scheduled using one piece of DCI as shown in FIG. 1B, the DCI may also be referred to as single DCI (single PDCCH). When a plurality of PDSCHs from multi TRPs are individually scheduled by using a plurality pieces of DCI as shown in FIG. 1D, the plurality pieces of DCI may also be referred to as multi-DCI (multiple PDCCHs).

According to such multi-TRP scenarios, more flexible transmission control using a high quality channel is possible.

A different cord word (CW) and a different layer may be transmitted from each TRP of multi TRPs. As a form of multi-TRP transmission, non-coherent joint transmission (NCJT) is being studied.

In NCJT, for example, TRP1 modulation-maps and layer-maps a first code word and transmits a first PDSCH using first precoding of a first number of layers (for example, two layers). Likewise, TRP2 modulation-maps and layer-maps a second code word and transmits a second PDSCH using second precoding of a second number of layers (for example, two layers).

Noted that the plurality of PDSCHs (multiple PDSCHs) that undergo NCJT may be defined as partially or completely overlapping one another with respect to at least one of time and frequency domains. That is, at least one of time and frequency resources of a first PDSCH from a first TRP and a second PDSCH from a second TRP may overlap.

These first PDSCH and second PDSCH may be assumed not to be quasi-co-located. Reception of multiple PDSCHs may be interchangeably read as simultaneous reception of PDSCHs that are not QCL type D.

To support multi-TRP transmissions within a cell (intra-cell, with the same cell ID) and between cells (inter-cell, with different cell IDs) based on a plurality of PDCCHs, such as in a multi-master mode, one control resource set (CORESET) in PDCCH configuration information (PDCCH-Config) may correspond to one TRP in RRC configuration information for linking a plurality of PDCCH/PDSCH pairs having a plurality of TRPs.

In NR Rel. 15, the maximum number of CORESETs for each PDCCH configuration information is three. In a plurality of TRP operations based on a plurality of PDCCHs, the maximum number of CORESETs for each PDCCH configuration information or BWP may be increased to five according to UE capability.

(TCI, Spatial Relation, QCL)

It is being considered that, in NR, UE controls reception processing (for example, at least one of reception, demapping, demodulation, decoding) and transmission processing (for example, at least one of transmission, mapping, precoding, modulation, and coding) of at least one of a signal and a channel (hereinafter, expressed as a signal/channel), based on a transmission configuration indication state (TCI state).

The TCI state may represent what applies to a downlink signal/channel. The equivalent of the TCI state that applies to an uplink signal/channel may be expressed as a spatial relation.

The TCI state is information relating to a quasi-co-location (QCL) of a signal/channel and may also be referred to as a spatial reception parameter, spatial relation information, or the like. The TCI state may be configured in UE per channel or per signal.

Note that, in the present disclosure, a TCI state of DL, a spatial relation of UL, and a TCI state of UL may be interchangeably read as one another.

The QCL is an index indicating a statistical property of a signal/channel. For example, when one signal/channel and another signal/channel have a QCL relation, which may mean that these different signals/channels can be assumed to have at least one of a Doppler shift, a Doppler spread, an average delay, a delay spread, and a spatial parameter (for example, a spatial reception parameter (spatial Rx parameter)) in common (QCL for at least one of these).

Note that a spatial reception parameter may correspond to a reception beam of UE (for example, a reception analog beam), or a beam may be specified based on a spatial QCL. The QCL in the present disclosure (or at least one element of QCL) may be interchangeably read as sQCL (spatial QCL).

A plurality of types (QCL types) may be specified for QCL. For example, four QCL types A to D with different parameters (or parameter sets) that can be assumed to be the same may be provided, and the parameters (which may also be referred to as QCL parameters) are shown below:

QCL Type A (QCL-A): Doppler shift, Doppler spread, average delay and delay spread, QCL type B (QCL-B): Doppler shift and Doppler spread, QCL type C (QCL-C): Doppler shift and average delay, QCL type D (QCL-D): Spatial reception parameter.

Assumption made by UE that one control resource set (CORESET), channel, or reference signal has a specific QCL (for example, QCL type D) relation with another CORESET, channel or reference signal may be referred to as QCL assumption.

UE may determine at least one of a transmission beam (Tx beam) and a reception beam (Rx beam) of a signal/channel, based on the TCI state or QCL assumption of the signal/channel.

The TCI state may be, for example, information relating to QCL of a target channel (in other words, a reference signal (RS) for the channel) and another signal (for example, another RS). The TCI state may be configured (indicated) by higher layer signaling, physical layer signaling, or a combination thereof.

In the present disclosure, the higher layer signaling may be, for example, any one of radio resource control (RRC) signaling, medium access Control (MAC) signaling, broadcast information, and the like or a combination thereof.

The MAC signaling may use, for example, a MAC control element (MAC CE), a MAC protocol data unit (PDU), and the like. The broadcast information may be, for example, a master information block (MIB), a system information block (SIB), a minimum system information (Remaining Minimum System Information (RMSI)), other system information (OSI), and the like.

The physical layer signaling may be, for example, downlink control information (DCI).

The channel for which a TCI state or a spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)) and an uplink control channel (Physical Uplink Control Channel (PUCCH)).

An RS having a QCL relation with the channel may be, for example, at least one of a synchronization signal block (SSB), a channel state information reference signal (CSI-RS), a sounding reference signal (SRS), CSI-RS for tracking (also referred to as a tracking reference signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may also be referred to as an SS/PBCH block.

UE may receive configuration information (for example, PDSCH-Config, tci-StatesToAddModList) including a list of TCI state information elements from higher layer signaling.

The TCI state information element ("TCI-state IE" of RRC) configured by higher layer signaling may include a TCI state ID and one or a plurality pieces of QCL information ("QCL-Info"). The QCL information may include at least one of information relating to an RS having a QCL relation (RS-related information) and information indicating a QCL type (QCL type information). The RS-related information may include information such as an RS index (for example, SSB index, Non-Zero-Power (NZP) CSI-RS resource ID (Identifier)), a cell index where the RS is located, and an index of a bandwidth part (BWP) where the RS is located.

In Rel. 15 NR, both QCL type A RS and QCL type D RS or only QCL type A RS can be configured to UE as a TCI state of at least one of PDCCH and PDSCH.

When a TRS is configured as QCL type A RS, it is assumed that the same TRS is periodically transmitted over a long period of time, unlike a PDCCH or PDSCH demodulation reference signal (DMRS). The UE can measure the TRS and calculate the average delay, delay spread, and the like.

When a TRS as QCL type A RS is configured in UE as a TCI state of a PDCCH or PDSCH DMRS, the UE can assume that the QCL type A parameters (average delay, delay spread, or the like) of the PDCCH or PDSCH DMRS and of the TRS are the same, thus, the UE can calculate the type A parameter (average delay, delay spread, or the like) of the PDCCH or PDSCH DMRS from the measurement result of the TRS. When performing channel estimation of at least one of the PDCCH and PDSCH, the UE can perform more accurate channel estimation by using the measurement result of the TRS.

UE in which QCL type D RS is configured can determine a UE reception beam (a spatial domain reception filter, a UE spatial domain reception filter) using the QCL type D RS.

A QCL type X RS of a TCI state may mean an RS that has a QCL type X relation with (DMRS of) a given channel/signal, and this RS may be referred to as a QCL source of the QCL type X of the TCI state.

<TCI State for PDCCH>

Information relating to QCL between a PDCCH (or a DMRS antenna port associated with the PDCCH) and an RS may also be referred to as a TCI state for the PDCCH or the like.

UE may determine a TCI state for a UE-specific PDCCH (CORESET), based on higher layer signaling. For example, one or a plurality of (K-number of) TCI states may be configured in UE for each CORESET by RRC signaling.

One of the plurality of TCI states configured by the RRC signaling for each CORESET may be activated in the UE by a MAC CE. The MAC CE may also be referred to as "TCI State Indication for UE-specific PDCCH MAC CE." The UE may monitor a CORESET, based on the active TCI state corresponding to the CORESET.

<TCU State for PDSCH>

Information relating to QCL between a PDSCH (or a DMRS antenna port associated with the PDSCH) and a DL-RS may be referred to as a TCI state for the PDSCH or the like.

UE may be notified of (configured with) M-number of (M≥1) TCI states for PDSCH (M-pieces of QCL information for PDSCH) by higher layer signaling. Note that the number M of TCI states configured in UE may be limited by at least one of the UE capability and a QCL type.

DCI used for scheduling a PDSCH may include a field indicating a TCI state for the PDSCH (which may also be referred to as, for example, a TCI field, a TCI state field, or the like). The DCI may be used for scheduling a PDSCH in one cell and may also be referred to as, for example, DL DCI, DL assignment, DCI format 1_0, DCI format 1-1, or the like.

Whether or not a TCI field is included in DCI may be controlled by information notified from a base station to UE. The information may be information indicating whether a TCI field is present or absent in DCI (for example, TCI existence information, TCI existence information in DCI, and a higher layer parameter, TCI-PresentInDCI). The information may be configured in the UE, for example, by higher layer signaling.

When more than eight types of TCI states are configured in UE, not more than eight types of TCI states may be activated (or specified) using a MAC CE. The MAC CE may also be referred to as "TCI States Activation/Deactivation for UE-specific PDSCH MAC CE." The value of the TCI field in the DCI may indicate one of the TCI states activated by the MAC CE.

When UE is configured with TCI existence information set to "enabled" for a CORESET that schedules a PDSCH (a CORESET used for a PDCCH transmission that schedules the PDSCH), the UE may assume that a TCI field exists in the DCI format 1-1 of the PDCCH that is transmitted on the CORESET.

When TCI existence information is not configured for a CORESET that schedules a PDSCH, or the PDSCH is scheduled by DCI format 1_0, if a time offset between reception of DL DCI (the DCI that schedules the PDSCH) and reception of the PDSCH corresponding to the DCI is not less than a threshold value, the UE may assume that the TCI state or QCL assumption for the PDSCH is the same as the TCI state or QCL assumption that is applied to the CORESET used for transmission of the PDCCH that schedules the PDSCH, in order to determine the QCL of the PDSCH antenna port.

When TCI existence information is set to "enabled," if a TCI field in DCI in a component carrier (CC) that schedules a PDSCH indicates an activated TCI state in the scheduled CC or DL BWP, as well as, the PDSCH is scheduled by DCI format 1-11, the UE may use a TCI according to the value of a TCI field in a detected PDCCH that has DCI in order to determine QCL of the PDSCH antenna port. When a time offset between reception of DL DCI (scheduling the PDSCH) and the PDSCH corresponding to the DCI (the PDSCH scheduled by the DCI) is not less than a threshold value, the UE may assume that a PDSCH DM-RS port of the serving cell is QCL with an RS in the TCI state with respect to a QCL type parameter that is given by the indicated TCI state.

When UE is configured with a single slot PDSCH, an indicated TCI state may be based on an activated TCI state in a slot with a scheduled PDSCH. When UE is configured with a multi-slot PDSCH, an indicated TCI state may be based on an activated TCI state in a first slot with a scheduled PDSCH, and the UE may expect the same TCI state over the slots that have the scheduled PDSCH. When UE is configured with a CORESET associated with a search space set for cross-carrier scheduling, if the UE is configured with TCI existence information set to "enabled" for the CORESET and at least one of the TCI states configured for a serving cell that is scheduled by the search space set contains QCL type D, the UE may assume that a time offset between the detected PDCCH and a PDSCH corresponding to the PDCCH is not less than a threshold value.

In an RRC connected mode, in both cases where TCI information in DCI (a higher layer parameter, TCI-PresentInDCI) is set to "enabled" and where the TCI information in DCI is not set, if a time offset between reception of DL DCI (the DCI that schedules a PDSCH) and the corresponding PDSCH (the PDSCH scheduled by the DCI) is less than a threshold value (applicable condition, first condition), the UE may assume that a PDSCH DM-RS port of the serving cell is QCL with an RS relating to a QCL parameter that is used for QCL indication of a PDCCH in a CORESET with the smallest (lowest) CORESET-ID in the latest (most recent) slot in which one or more CORESETs in an active BWP of the serving cell are monitored by the UE and in which the CORESET is associated with the monitored search space. This RS may also be referred to as a PDSCH default TCI state or PDSCH default QCL assumption.

The time offset between reception of DL DCI and reception of a PDSCH corresponding to the DCI may also be referred to as a scheduling offset.

Further, the above threshold value may also be referred to as a QCL time duration, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, or the like.

The QCL time duration may be based on UE capability, for example, based on a delay required for PDCCH decoding and beam switching. The QCL time duration may be the minimum time required for UE to perform PDCCH reception and application of spatial QCL information that is received in DCI for PDSCH processing. The QCL time duration may be represented by the number of symbols for each subcarrier interval, or may be represented by time (for example, μs). The QCL time duration information may be reported from UE to a base station as UE capability information or may be configured in UE from a base station using higher layer signaling.

For example, the UE may assume that the PDSCH DMRS port is QCL with a DL-RS based on a TCI state activated for a CORESET corresponding to the smallest CORESET-ID. The latest slot may be, for example, a slot that receives the DCI that schedules the PDSCH.

Note that the CORESET-ID may be an ID (ID for identifying a CORESET, controlResourceSetId) configured by an RRC information element "ControlResourceSet".

When no CORESET is configured for the CC (of a PDSCH), the default TCI state may be an activated TCI state with the lowest ID, which is applicable to a PDSCH in an active DL BWP of the CC.

In Rel. 16 or later, when a PDSCH and a PDCCH that schedules the PDSCH are in different component carriers (CC) (cross-carrier scheduling), if a delay from the PDCCH to the PDSCH (PDCCH-to-PDSCH delay) is shorter than the QCL time duration, or if no TCI state is in the DCI for the scheduling, the UE may acquire QCL assumption for the scheduled PDSCH from the active TCI state with the lowest ID, which is applicable to a PDSCH in an active BWP of the scheduled cell.

<Spatial Relation for PUCCH>

UE may be configured with a parameter used for PUCCH transmission (PUCCH configuration information, PUCCH-Config) by higher layer signaling (for example, Radio Resource Control (RRC) signaling). The PUCCH configuration information may be configured for each partial band (for example, an uplink bandwidth part (Bandwidth Part (BWP))) in a carrier (also referred to as a cell or a component carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of PUCCH resource indexes (ID, for example, PUCCH-ResourceId).

Further, when UE does not have individual PUCCH resource configuration information (for example, dedicated PUCCH resource configuration) provided by PUCCH resource set information in PUCCH configuration information (before RRC setup), the UE may determine a PUCCH resource set, based on a parameter (for example, pucch-ResourceCommon) in system information (for example, System Information Block Type 1 (SIB1) or Remaining Minimum System Information (RMSI)). The PUCCH resource set may include 16 PUCCH resources.

On the other hand, when UE has the individual PUCCH resource configuration information (UE-specific uplink control channel configuration, individual PUCCH resource configuration) (after RRC setup), the UE may determine a PUCCH resource set according to the number of UCI information bits.

The UE may determine one PUCCH resource (index) in the PUCCH resource set (for example, a PUCCH resource set that is cell-specifically or UE-specifically determined), based on at least one of a value of a field (for example, a PUCCH resource indicator field) in the downlink control information (DCI) (for example, DCI format 1_0 or 1-1 used for PDSCH scheduling), the number of CCEs (NCCE) in the control resource set (CORESET) for receiving a PDCCH that carries the DCI, and an index (nCCE, 0) of a leading (first) CCE in the PDCCH reception.

The PUCCH spatial relation information (for example, the RRC information element "PUCCH-spatialRelation-Info") may indicate a plurality of candidate beams (spatial domain filters) for PUCCH transmission. The PUCCH spatial relation information may indicate a spatial relation between an RS (Reference signal) and a PUCCH.

The list of PUCCH spatial relation information may include some elements (PUCCH spatial relation information IE (Information Element)). Each PUCCH spatial relation information may include, for example, at least one of an index of PUCCH spatial relation information (ID, for example, pucch-SpatialRelationInfoId), an index of a serving cell (ID, for example, servingCellId), and information relating to an RS (reference RS) having a spatial relation with the PUCCH.

For example, the information relating to the RS may be an SSB index, a CSI-RS index (for example, NZP-CSI-RS resource configuration ID), or an SRS resource ID and a BWP ID. The SSB index, CSI-RS index and SRS resource ID may be associated with at least one of a beam, a resource and a port that are selected by measuring the corresponding RS.

When more than one piece of spatial relation information relating to a PUCCH is configured, the UE may control to activate one piece of PUCCH spatial relation information for one PUCCH resource during a given time period, based on a PUCCH spatial relation Activation/Deactivation MAC CE.

In Rel-15 NR, the PUCCH spatial relation Activation/Deactivation MAC CE is expressed by a total of 3 octets (8 bits×3=24 bits) of octets (Octet, Oct) 1 to 3.

The MAC CE may include information such as an applicable serving cell ID ("Serving Cell ID" field), a BWP ID ("BWP ID" field), and a PUCCH resource ID ("PUCCH Resource ID" field).

Further, the MAC CE includes "Si" (i=0 to 7) fields. When a given Si field indicates 1, the UE activates spatial relation information of spatial relation information ID #i. When a given Si field indicates 0, the UE deactivates spatial relation information of spatial relation information ID #i.

The UE may activate the PUCCH relation information specified by the MAC CE 3 ms after transmitting an acknowledgment (ACK) to the PUCCH spatial relation Activation MAC CE.

<Spatial Relation for SRS, PUSCH>

UE may receive information used for transmitting a reference signal for measurement (for example, a sounding reference signal (SRS)) (SRS configuration information, for example, a parameter in "SRS-Config" of an RRC control element).

Specifically, UE may receive at least one of: information relating to one or a plurality of SRS resource sets (SRS resource set information, for example, an RRC control element "SRS-ResourceSet"); and information relating to one or a plurality of SRS resources (SRS resource Information, for example, an RRC control element "SRS-Resource").

One SRS resource set may be associated with several SRS resources (may group several SRS resources). Each SRS resource may be identified by an SRS Resource Indicator (SRI) or an SRS resource ID (Identifier).

The SRS resource set information may include information on an SRS resource set ID (SRS-ResourceSetId), a list of SRS resource IDs (SRS-ResourceId) used in the resource set, an SRS resource type, and SRS usage.

Here, the SRS resource type may indicate any of periodic SRS (P-SRS), semi-persistent SRS (SP-SRS), and aperiodic SRS (A-SRS, AP-SRS). Note that UE may transmit P-SRS and SP-SRS periodically (or periodically after activation) and may transmit A-SRS based on an SRS request of DCI.

The usage (RRC parameter "usage", L1 (Layer-1) parameter "SRS-SetUse") may be, for example, beam management (beamManagement), codebook-based transmission (codebook: CB), non-codebook-based transmission (non-Codebook: NCB), antenna switching (antennaSwitching), or the like. The SRS usage of codebook-based transmission or non-codebook-based transmission may be used to determine a precoder for codebook-based or non-codebook-based PUSCH transmission based on an SRI.

For example, in the case of codebook-based transmission, UE may determine a precoder for PUSCH transmission, based on an SRI, transmitted rank indicator (TRI), and transmitted precoding matrix indicator (TPMI). In the case of non-codebook-based transmission, the UE may determine a precoder for PUSCH transmission, based on an SRI.

The SRS resource information may include an SRS resource ID (SRS-ResourceId), the number of SRS ports, an SRS port number, a transmission Comb, SRS resource mapping (for example, a time and/or frequency resource position, a resource offset, a resource cycle, the number of repetition, the number of symbols, an SRS bandwidth and the like), hopping-related information, an SRS resource type, a series ID, SRS spatial relation information and the like.

The SRS spatial relation information (for example, an RRC information element "spatialRelationInfo") may indicate spatial relation information between a given reference signal and an SRS. The reference signal may be at least one of a synchronization signal/broadcast channel (Synchronization Signal/Physical Broadcast Channel: SS/PBCH) block, a channel state information reference signal (CSI-RS), and an SRS (for example, another SRS). The SS/PBCH block may also be referred to as a synchronization signal block (SSB).

The SRS spatial relation information may include at least one of an SSB index, a CSI-RS resource ID, and an SRS resource ID, as an index of the above-described reference signal.

Note that, in the present disclosure, the SSB index, SSB resource ID, and SSBRI (SSB Resource Indicator) may be interchangeably read as one another. The CSI-RS index, CSI-RS resource ID and CRI (CSI-RS Resource Indicator) may be interchangeably read as one another. In addition, the SRS index, SRS resource ID, and SRI may be interchangeably read as one another.

The SRS spatial relation information may include a serving cell index, a BWP index (BWP ID), and the like corresponding to the above-described reference signal.

In NR, transmission of an uplink signal may be controlled based on the presence or absence of beam correspondence (BC). The BC may be, for example, the capability of a node (for example, a base station or UE) determining a beam used for transmitting a signal (transmission beam, Tx beam) based on a beam used for receiving a signal (reception beam, Rx beam).

Note that the BC may also be referred to as transmission/reception beam correspondence (Tx/Rx beam correspondence), beam reciprocity, beam calibration, Calibrated/Non-calibrated, reciprocity calibrated/non-calibrated, a degree of correspondence, a degree of agreement, or the like.

For example, in the absence of BC, UE may transmit an uplink signal (for example, PUSCH, PUCCH, SRS, or the like) using the same beam (a spatial domain transmission filter) as the beam of an SRS (or an SRS resource) that is indicated by a base station based on the measurement result of one or more SRSs (or SRS resources).

On the other hand, in the presence of BC, UE may transmit an uplink signal (for example, PUSCH, PUCCH, SRS, or the like) using the same or corresponding beam (a spatial domain transmission filter) as the beam (a spatial domain reception filter) used for receiving a SSB or CSI-RS (or CSI-RS resource).

When spatial relation information relating to an SSB or CSI-RS and SRS is configured for a given SRS resource (for example, in the presence of BC), UE may transmit the SRS resource using the same spatial domain filter (a spatial domain transmission filter) as the spatial domain filter (a spatial domain reception filter) for receiving the SSB or CSI-RS. In this case, the UE may assume that the UE receiving beam of the SSB or CSI-RS and the UE transmitting beam of the SRS are the same.

When spatial relation information relating to a given SRS (target SRS) and another SRS (reference SRS) is configured for the SRS resource (target SRS) (for example, in the absence of BC), UE may transmit the target SRS resource using the same spatial domain filter (a spatial domain transmission filter) as the spatial domain filter (a spatial domain transmission filter) for transmitting the reference SRS. That is, in this case, the UE may assume that the UE transmitting beam of the reference SRS and the UE transmitting beam of the target SRS are the same.

UE may determine the spatial relation of a PUSCH scheduled by DCI, based on the value of a field (for example, an SRS Resource Identifier (SRI) field) in the DCI (for example, DCI format 0-1). Specifically, the UE may use, for PUSCH transmission, the spatial relation information of an SRS resource (for example, an RRC information element "spatialRelationInfo") determined based on the value of the field (for example, SRI).

When using codebook-based transmission for PUSCH, UE may have two SRS resources configured by RRC and one of the two SRS resources may be indicated by DCI (1 bit field). When using non-codebook-based transmission for PUSCH, UE may have four SRS resources configured by RRC and one of the four SRS resources may be indicated by DCI (2-bit field). In order to use a spatial relation other than the two or four spatial relations configured by the RRC, reconfiguration of the RRC is required.

Note that a DL-RS can be configured for the spatial relation of an SRS resource used for a PUSCH. For example, for an SP-SRS, UE can be configured with spatial relations of a plurality of (for example, up to 16) SRS resources by RRC, and one of the plurality of SRS resources can be indicated by a MAC CE.

(DL and UL Common Beam)

Features that facilitate more efficient DL/UL beam management (with lower latency and lower overhead) are being considered, for at least one of supporting high mobility within a cell and high mobility between L1/L2 centric cells and supporting a larger number of TCI states. For example, a common beam for data and control in DL and UL is being studied, especially in an intra-band CA.

(Simultaneous Beam Update Across a Plurality of CCs)

In Rel. 16, one MAC CE can update the beam indexes (TCI states) of a plurality of CCs.

UE can be configured with up to two applicable CC lists (for example, applicable-CC-lists) by RRC. When two applicable CC lists are configured, the two applicable CC lists may respectively correspond to an intra-band CA in FR1 and an intra-band CA in FR2.

A PDCCH TCI state activation MAC CE activates a TCI state associated with the same CORESET ID on all BWP/CCs in the applicable CC list.

A PDSCH TCI state activation MAC CE activates a TCI state on all BWP/CCs in the applicable CC list.

An A-SRS/SP-SRS spatial relation activation MAC CE activates a spatial relation associated with the same SRS resource ID on all BWP/CCs in the applicable CC list.

Figure 2:
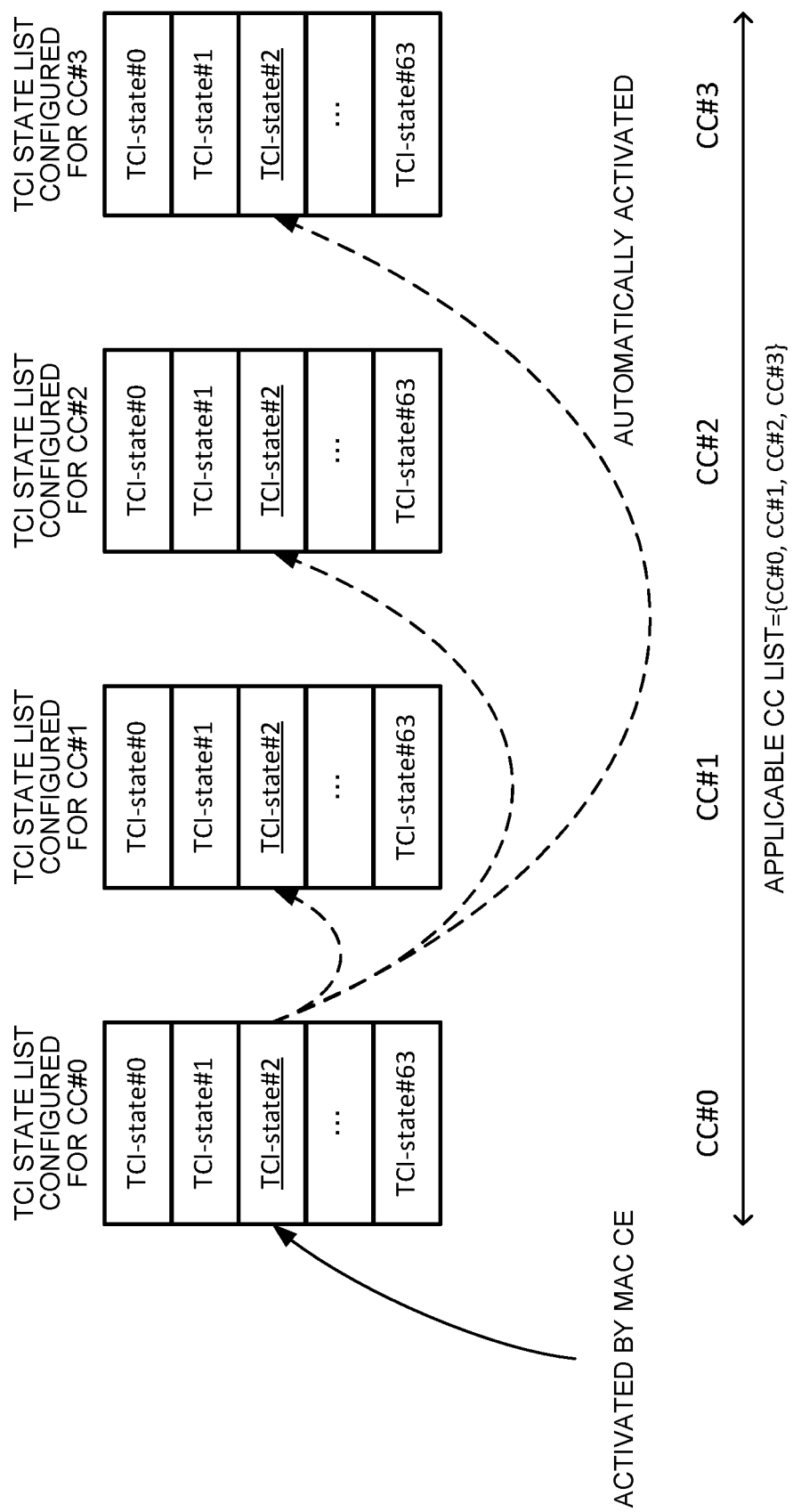
FIG. 2 is a diagram to show an example of simultaneous beam update for a plurality of CCs.

In an example of FIG. 2, UE is configured with an applicable CC list indicating CCs #0, #1, #2, #3 and a list indicating 64 TCI states for a CORESET or a PDSCH of each CC. When one TCI state of CC #0 is activated by a MAC CE, the corresponding TCI states are activated in CCs #1, #2, and #3.

(Default TCI State/Default Spatial Relation/Default PL-RS)

As shown in FIG. 3, in an RRC connected mode, in both cases where TCI information in DCI (higher layer parameter, TCI-PresentInDCI) is set to "enabled" and where TCI information in DCI is not configured, if a time offset between reception of DL DCI (DCI scheduling a PDSCH) and the corresponding PDSCH (the PDSCH scheduled by the DCI) is smaller than a threshold value (timeDurationForQCL) (applicable condition, first condition), and if non-cross-carrier scheduling, the PDSCH TCI state (the default TCI state) may be the TCI state of the lowest CORESET ID in the latest slot in an active DL BWP of the CC (of a specific UL signal). Otherwise, the PDSCH TCI state (the default TCI state) may be the TCI state of the lowest TCI state ID of the PDSCH in an active DL BWP of a scheduled CC.

In Rel. 15, individual MAC CEs, which are a PUCCH spatial relation activation/deactivation MAC CE and an SRS spatial relation activation/deactivation MAC CE, are required. The PUSCH spatial relation follows the SRS spatial relation.

In Rel. 16, at least one of a PUCCH spatial relation activation/deactivation MAC CE and an SRS spatial relation activation/deactivation MAC CE may not be used.

If neither a spatial relation nor PL-RS is configured for a PUCCH in FR2 (applicable condition, second condition), default assumption of the spatial relation and PL-RS (default spatial relation and default PL-RS) is applied to the PUCCH. If neither a spatial relation nor PL-RS is configured for an SRS (an SRS resource for the SRS or an SRS resource corresponding to an SRI in DCI format 0_1 for scheduling a PUSCH) in FR2 (application condition, second condition), default assumption of the spatial relation and PL-RS (default spatial relation and default PL-RS) is applied to the PUSCH and SRS that are scheduled by the DCI format 0_1.

If a CORESET is configured in an active DL BWP on the CC, the default spatial relation and default PL-RS may be the TCI state or QCL assumption of the CORESET with the lowest CORESET ID in the active DL BWP. If no CORESET is configured in the active DL BWP on the CC, the default spatial relationship and default PL-RS may be the active TCI state with the lowest ID applicable to a PDSCH in the active DL BWP.

In Rel. 15, the spatial relation of a PUSCH scheduled by DCI format 0_0 follows the spatial relation of a PUCCH resource with the lowest PUCCH resource ID among the active spatial relations of PUCCH on the same CC. The network needs to update PUCCH spatial relations on all the SCells, even if no PUCCH is not transmitted on the SCells.

In Rel. 16, PUCCH configuration is not required for a PUSCH scheduled by DCI format 0_0. If there is no active PUCCH spatial relation or no PUCCH resource on the active UL BWP in the CC for a PUSCH scheduled by DCI format 0_0 (applicable condition, second condition), the default spatial relation and default PL-RS are applied to the PUSCH.

(PDSCH Default TCI State Using Cross-Carrier Scheduling)

When UE is configured with a CORESET associated with a search space set for cross-carrier scheduling, if a PDCCH that carries scheduling DCI and a PDSCH scheduled by the DCI are transmitted on the same carrier, the UE follows the following procedures A1 and A2.

[Procedure A1]

The UE assumes that, for the CORESET, TCI existence information (TCI-PresentInDCI) in DCI is set to "enabled" or TCI existence information for format 1-2 (TCI-PresentInDCI-ForFormat1_2) is configured.

[Procedure A2]

When one or more TCI states configured for a serving cell that is scheduled by the search space set include "QCL type D," the UE assumes that a time offset between reception of a detected PDCCH in the search space set and the corresponding PDSCH is not less than a threshold value (timeDurationForQCL).

The time offset between reception of the DL DCI and reception of a PDSCH corresponding to the DCI may also be referred to as a scheduling offset. The above threshold value may also be referred to as a QCL time duration, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, or the like.

If a PDCCH that carries scheduling DCI is received on one CC and a PDSCH scheduled by the DCI is on another CC, the UE follows the following procedures B1 and B2.

[Procedure B1]

The threshold value (timeDurationForQCL) is determined based on the scheduled PDSCH subcarrier interval. If the PDCCH subcarrier interval configuration (μPDCCH)<the PDSCH subcarrier interval configuration (μPDSCH), additional timing delay d is added to the threshold value.

[Procedure B2]

In both cases where TCI existence information in DCI is set to "enabled" and an offset between reception of the DL DCI and the corresponding PDSCH is smaller than the threshold value and where TCI existence information in DCI is not configured, the UE acquires QCL assumption for the scheduled PDSCH from the activated TCI state (default TCI state) with the lowest ID from among the activated TCI states applicable to a PDSCH in an active BWP of the scheduled cell.

(Multi-Slot PDSCH)

If a time offset between reception of DL DCI and the corresponding PDSCH is not less than a threshold value, the UE may assume that the PDSCH DMRS port of the serving cell is quasi-co-located with an RS in the TCI state relating to a QCL type parameter that is given by the indicated TCI state. Here, the threshold value is based on the reported UE capability. When the UE is configured with a single slot PDSCH, the indicated TCI state should be based on the activated TCI state in the slot with the scheduled PDSCH. When the UE is configured with a multi-slot PDSCH (multi-slot repetition transmission (repetition, aggregation)), the indicated TCI state should be based on the activated TCI state in the first slot with the scheduled PDSCH, and the UE assumes that the activated TCI state is the same across the slots with the scheduled PDSCH.

For the "indicated TCI state," the TCI state in the first slot applies to all the slots. There is no "indicated TCI state" for the "default TCI state/QCL", and it is not clear how to map the TCI state/QCL across slots.

(Basic Beam Operation)

A basic beam operation may be a single active beam operation. In one CC, a MAC CE indicates a single active beam for all DL/UL channels. In an intra-band CA, all CCs share the same QCL type D beam. In such cases, the following features 1 to 3 eliminate the MAC CE overhead.

[Feature 1]

The PDSCH default TCI state in Rel. 15 (when tci-PresentInDCI is not configured or the time offset is shorter than the threshold value). The TCI state of a PDSCH follows the TCI state of a PDCCH. There is no need for a MAC CE for the PDSCH.

[Feature 2]

Simultaneous update of PDCCH TCI states in Rel. 16. One MAC CE updates a plurality of TCI states of PDCCHs on all CCs. There is no need for an individual MAC CE for each CC.

[Feature 3]

The default spatial relation for a PUCCH/SRS/PUSCH in Rel. 16. The UL beam follows the TCI state of a PDCCH on the same CC. There is no need for a MAC CE for an UL channel.

As described above, one MAC CE for a PDCCH TCI state can update the beams of all UL/DL channels on all the CCs that are configured in an applicable CC list.

If there is a single active TCI state of a PDCCH and non-cross-carrier scheduling is used, the default beams for all the UL/DL channels are the same. In this case, the "lowest CORESET ID" and "lowest CORESET ID on the latest slot" have the same meaning.

If a multi-active beam operation or cross-carrier scheduling is considered, default beams for all the UL/DL channels can be different. If DL is set to cross-carrier scheduling and no CORESET is configured on the UL CC, the conditions for switching the default beam to "PDCCH TCI state" and to "PDSCH TCI state" are different.

There is a case where a CORESET is configured on a scheduled CC and cross-carrier scheduling is performed. In this case, the default beams are different in UL and DL.

As such, when a DL default beam (TCI state/QCL assumption) and a UL default beam (spatial relation/PL-RS) are different, UE operation becomes complicated. If the UE operation becomes complicated, the cost may increase or the system performance may deteriorate.

Thus, the inventors of the present invention came up with the idea of a method for determining a default DL beam and a default UL beam.

Hereinafter, embodiments according to the present disclosure will be described in detail with reference to the drawings. The radio communication methods according to the embodiments may be applied independently or in combination.

In the present disclosure, "A/B" and "at least one of A and B" may be interchangeably read as each other. A cell, a CC, a carrier, a BWP, an active DL BWP, an active UL BWP, and a band herein may be interchangeably read as one another. An index, an ID, an indicator, and a resource ID herein may be interchangeably read as one another. An RRC parameter, a higher layer parameter, an RRC information element (IE), and an RRC message herein may be interchangeably read as one another.

In the present disclosure, a beam, a TCI state, QCL assumption, a QCL parameter, a spatial domain reception filter, a UE spatial domain reception filter, a UE reception beam, a DL reception beam, DL precoding, a DL precoder, a DL-RS, QCL type D RS of a TCI state or QCL assumption, and QCL type A RS of a TCI state or QCL assumption, may be interchangeably read as one another. A QCL type X-RS, a DL-RS associated with QCL type X, a DL-RS having QCL type X, a DL-RS source, an SSB, and a CSI-RS herein may be interchangeably read as one another.

In the present disclosure, a beam, spatial setting, a spatial relation, spatial relation information, spatial relation assumption, a QCL parameter, a spatial domain transmission filter, a UE spatial domain transmission filter, a UE transmission beam, a UL transmission beam, UL precoding, a UL precoder, a space relation RS, a DL-RS, QCL assumption, an SRI, a spatial relation based on SRI, a UL TCI, and a PL-RS may be interchangeably read as one another.

In the present disclosure, DCI format 0_0, DCI without SRI, DCI without spatial relation indication, and DCI without CIF may be interchangeably read as one another. DCI format 0_1, DCI including SRI, DCI including spatial relation indication, and DCI including CIF herein may be interchangeably read as one another.

In the present disclosure, a specific signal, a UL signal, a UL channel, a specific UL signal, and a specific type UL signal may be interchangeably read as one another. The specific UL signal may be at least one of a PUCCH (individual PUCCH), an SRS (individual SRS), a PUSCH scheduled by DCI format 0_1, and a PUSCH scheduled by DCI format 0_0.

In the present disclosure, a specific signal, a DL signal, a DL channel, a specific DL signal, a specific type DL signal, a specific DL channel, and a specific type DL channel may be interchangeably read as one another. The specific DL signal may be at least one of a PDCCH, a PDSCH, and a CORESET.

In the present disclosure, an updated TCI state, an activated TCI state, an indicated TCI state, a target TCI state, a TCI state of an activated PL-RS, a TCI state referenced by at least one of the default spatial relation and default PL-RS of a specific UL signal, and a reference TCI state may be interchangeably read as one another.

In the present disclosure, X is quasi co-located (QCLed) with Y, and X and Y are quasi co-located with 'QCL-TypeD', X and Y are quasi co-located with respect to 'QCL-TypeD', and X and Y are in a QCL type D relation may be interchangeably read as one another. X and Y may be an RS or an RS resource.

In the present disclosure, a TRP, a panel, a base station, and a CORESET pool may be interchangeably read as one another.

(Radio Communication Method)

UE may receive first information relating to a PDSCH. The first information may be at least one of a PDSCH configuration, a CORESET configuration, and DCI (DL DCI) that schedules a PDSCH.

UE may receive second information relating to a specific UL signal. The second information may be at least one of an SRS resource parameter, a PUCCH resource parameter, and a CORESET configuration.

When the first information satisfies a first condition, the UE may use a first QCL parameter for receiving a PDSCH, instead of a QCL parameter indicated for the PDSCH, and, when the second information satisfies a second condition, the UE may use a second QCL parameter for transmitting a specific UL signal, instead of a QCL parameter indicated for the specific UL signal.

The first condition may be the above-described default TCI state application condition. The QCL parameter indicated for the PDSCH may be a TCI state indicated by at least one of an MAC CE and TCI existence information in DCI or may be a TCI state or QCL assumption that is applied to a CORESET used for transmission of a PDCCH that schedules the PDSCH. The first QCL parameter may be a default TCI state.

The second condition may be the above-described default spatial relation/default PL-RS application condition. The QCL parameter indicated for the specific UL signal may be a spatial relation (spatial relation information)/path loss reference RS for the specific UL signal. The second QCL parameter may be a default spatial relation/default PL-RS.

In the present disclosure, when a specific signal (PDSCH/PUSCH/PUCCH/SRS) uses cross-carrier scheduling, at least one of a default QCL, a default TCI state, a default spatial relation, and a default PL-RS may be an active PDSCH TCI state with the lowest ID on a scheduled CC.

In the present disclosure, an active PDSCH TCI state with the lowest ID on a scheduled CC, a TCI state or QCL assumption of the lowest CORESET ID on a scheduling CC, a TCI state or QCL assumption of the lowest CORESET ID in the latest slot on a scheduled CC, a TCI state or QCL assumption of the lowest CORESET ID on a scheduled CC, and a TCI state or QCL assumption of the lowest CORESET ID in the latest slot on a scheduled CC may be interchangeably read as one another.

Since a TCI state is indicated across a plurality of cells, at least one of the default QCL, default TCI state, default spatial relation, and default PL-RS of a cross-carrier scheduled signal, may be limited to an intra-band CA. At least one of the default QCL, default TCI state, default spatial relation, and default PL-RS of a cross-carrier scheduled signal may be limited when UE capability information indicating support for the cross-carrier scheduled signal is reported.

If UE is configured with a CORESET in an active BWP of a scheduled CC, the default TCI state may follow a TCI state of the lowest CORESET ID in the active BWP of the scheduled CC. Otherwise, the default TCI state may follow a TCI state with the lowest TCI state ID of a PDSCH in the active DL BWP of the scheduled CC.

If UE is configured with a COREST in the active BWP of a scheduled CC, the default TCI state may follow a TCI state of the lowest CORESET ID in the latest slot in the active BWP of the scheduled CC. Otherwise, the default TCI state may follow a TCI state with the lowest TCI state ID of a PDSCH in the active DL BWP of the scheduled CC.

First Embodiment

The definition of a PDSCH default TCI state/QCL may be changed. The PDSCH default TCI state/QCL may be matched with the UL rules.

For example, as shown in FIG. 4, if a CORESET is configured in an active DL BWP on the CC (of PDSCH), the PDSCH default TCI state/QCL may be a TCI state of the lowest CORESET ID. Otherwise, the PDSCH default TCI state/QCL may be the lowest TCI state ID of the PDSCH in the active DL BWP on the same CC.

According to this method, the default TCI state/QCL does not change over time, which is effective for a multi-slot PDSCH.

To distinguish from the operation of Rel. 15, this default TCI state/QCL may be applied when at least one of the following conditions 1 and 2 is satisfied.

[Condition 1]

A new RRC parameter is configured. The new RRC parameter may be a default QCL enabler (for example, enablerDefaultQCL_r17).

[Condition 2]

The corresponding UE capability is reported.

The UE may follow at least one of the following modes 1-1 to 1-5.

<<Mode 1-1>>

The following procedures may be specified for the default QCL of a PDSCH that uses a single TRP.

Regardless of the configuration of TCI existence information in DCI in an RRC connected mode and TCI existence information in format 1-2 DCI, if all TCI codepoints are mapped with a single TCI state, and an offset between reception of DL DCI and the corresponding PDSCH is smaller than a threshold value, the UE may follow at least one of the following procedures 1 and 2.

[Procedure 1-1]

If a default QCL enabler is configured, the UE may assume that the PDSCH DMRS port of the serving cell is quasi-co-located with an RS relating to a QCL parameter that is used for PDCCH Quasi-Co-Location indication of a CORESET with the lowest CORESET ID in an active BWP of the serving cell.

[Procedure 1-2]

Otherwise, the UE may assume that the PDSCH DMRS port of the serving cell is quasi-co-located with an RS relating to a QCL parameter that is used for PDCCH Quasi-Co-Location indication of a CORESET with the lowest CORESET ID in the latest slot in which one or more CORESETs in an active BWP of the serving cell are monitored by the UE and in which the CORESET is associated with the monitored search space.

<<Mode 1-2>>

The following procedures may be specified for the default QCL of a PDSCH that uses multi TRPs and multi DCIs.

When the UE is configured by a higher layer parameter (for example, PDCCH-Config) that contains two different values of a CORESET pool index (for example, CORESET-PoolIndex) in CORESET information (for example, ControlResourceSet), if an offset between reception of DL DCI and the corresponding PDSCH is smaller than a threshold value in both cases where, in an RRC connected mode, TCI existence information in DCI is set to "enabled" and where TCI existence information in DCI is not configured, the UE may follow at least one of the following procedures 1-1 and 1-2.

[Procedure 1-1]

If a default QCL enabler is configured, the UE may assume that the PDSCH DMRS port that is associated with the value of the CORESET pool index of the serving cell is quasi-co-located with an RS relating to a QCL parameter that is used for PDCCH Quasi-Co-Location indication of a CORESET with the lowest CORESET ID among a plurality of CORESETs. The plurality of CORESETs are configured with the same value as the CORESET pool index of the PDCCH that schedules the PDSCH in an active BWP of the serving cell.

[Procedure 1-2]

Otherwise, the UE may assume that PDSCH DMRS port that is associated with the value of the CORESET pool index of the serving cell is quasi-co-located with an RS relating to a QCL parameter that is used for PDCCH Quasi-Co-Location indication of a CORESET with the lowest CORESET ID among a plurality of CORESETs in which the CORESET is associated with the monitored search space. The plurality of CORESETs are configured with the same value as the PDCCH CORESET pool index in the latest slot where one or more CORESETs are associated with the same value as the CORESET pool index of the PDCCH that schedules the PDSCH in an active BWP of the serving cell.

<<Mode 1-3>>

The following procedures may be specified for the default QCL of a PDSCH that uses multi TRPs and single DCI.

If an offset between reception of DL DCI and the corresponding PDSCH is less than a threshold value, and at least one configured TCI state for the serving cell of a scheduled PDSCH includes "QCL type D," and at least one TCI codepoint indicates two TCI states, the UE may follow at least one of the following procedures 1-1 and 1-2.

[Procedure 1-1]

When a default QCL enabler is configured, the UE may follow the following procedures 1-1-1 and 1-1-2.

[[Procedure 1-1-1]]

For a first TCI state, the UE may assume that the PDSCH DMRS port that is associated with the value of a CORESET pool index of the serving cell is quasi-co-located with an RS relating to a QCL parameter that is used for PDCCH Quasi-Co-Location indication of a CORESET with the lowest CORESET ID in an active BWP of the serving cell.

[[Procedures 1-1-2]]

For a second TCI state, the UE may assume that the PDSCH DMRS port is quasi-co-located with an RS relating to a QCL parameter that is associated with the second TCI state of the TCI state corresponding to the lowest codepoint of the TCI codepoints containing two different TCI states.

[Procedure 1-2]

Otherwise, the UE may assume that the PDSCH DMRS port is quasi-co-located with an RS relating to a QCL parameter that is associated with a TCI state corresponding to the lowest codepoint among the TCI codepoints containing the two different TCI states.

<<Mode 1-4>>

The following procedures may be specified for the default QCL of a PDSCH that uses a multi-slot PDSCH.

If a time offset between reception of DL DCI and the corresponding PDSCH is not less than a threshold value, the UE may assume that the PDSCH DMRS port of the serving cell is quasi-co-located with an RS in a TCI state with respect to the QCL type parameter given by an indicated TCI state. Here, the threshold value is based on the reported UE capability. When the UE is configured with a single slot PDSCH, the indicated TCI state should be based on an activated TCI state in a slot with a scheduled PDSCH. When the UE is configured with a multi-slot PDSCH, if a default QCL enabler is configured, the activated TCI state or QCL assumption in a first slot with a scheduled PDSCH is applied across all the slots with the scheduled PDSCH. Otherwise, the indicated TCI state should be based on an activated TCI state in a first slot with a scheduled PDSCH, and the UE assumes that the activated TCI state is the same across the slots with the scheduled PDSCH.

<<Mode 1-5>>

The following procedures may be specified for the default QCL of a PDSCH that uses cross-carrier scheduling.

If a PDCCH that carries scheduling DCI is received on one CC, and a default QCL enabler is configured, and the UE is not configured with any CORESET in the CC (in an active BWP in the CC), the UE may follow at least one of the following procedures 1-1 and 1-2.

[Procedure 1-1]

The threshold value (timeDurationForQCL) is determined based on the scheduled PDSCH subcarrier interval. If the PDCCH subcarrier interval configuration ($\mu$PDCCH)<the PDSCH subcarrier interval configuration ($\mu$PDSCH), additional timing delay d is added to the threshold value.

[Procedure 1-2]

In both cases where TCI existence information in DCI is set to "enabled" and an offset between reception of DL DCI and the corresponding PDSCH is smaller than the threshold value and where TCI existence information in DCI is not configured, the UE acquires QCL assumption for the scheduled PDSCH from an activated TCI state with the lowest ID (default TCI state) among the activated TCI states applicable to a PDSCH in an active BWP of the scheduled cell.

If a PDCCH that carries scheduling DCI is received on one CC, and a default QCL enabler is not configured, and a PDSCH scheduled by the DCI is on another CC, the UE may follow the following procedures 2-1 and 2-2.

[Procedure 2-1]

The threshold value (timeDurationForQCL) is determined based on the scheduled PDSCH subcarrier interval. If the PDCCH subcarrier interval configuration ($\mu$PDCCH)<the PDSCH subcarrier interval configuration ($\mu$PDSCH), additional timing delay d is added to the threshold value.

[Procedure 2-2]

In both cases where TCI existence information in DCI is set to "enabled" and an offset between reception of DL DCI and the corresponding PDSCH is smaller than the threshold value and where TCI existence information in DCI is not configured, the UE acquires QCL assumption for the scheduled PDSCH from an activated TCI state with the lowest ID (default TCI state) among the activated TCI states applicable to a PDSCH in an active BWP of the scheduled cell.

According to the above-described first embodiment, UE can appropriately determine a default QCL of a PDSCH.

Second Embodiment

The definition of a default spatial relation/PL-RS of a specific UL signal (PUCCH/SRS/PUSCH) may be changed. The default spatial relation/PL-RS of the specific UL signal may be matched with the DL rules.

For example, as shown in FIG. 5, in the case of non-cross-carrier scheduling, the default spatial relation/PL-RS of a specific UL signal may be a TCI state of the lowest CORESET ID in the latest slot in an active DL BWP of the CC (of the specific UL signal). Otherwise, the default spatial relation/PL-RS of a specific UL signal may be a TCI state of the lowest TCI state ID of a PDSCH in an active DL BWP of a scheduled CC.

To distinguish from the operation of Rel. 15, this default spatial relation/PL-RS may be applied when at least one of the following conditions 1 and 2 is satisfied.

[Condition 1]

A New RRC parameters is configured. The new RRC parameter may be a default spatial relation (beam/PL) enabler (for example, enablerDefaultSpatialRelation_r17).

[Condition 2]

The corresponding UE capability is reported.

The UE may follow at least one of the following modes 2-1 to 2-5.

<<Mode 2-1>>

The following procedure may be specified for the default spatial relation for an SRS.

If default beam path loss enablement information for an SRS (for example, a higher layer parameter, enableDefaultBeamPlForSRS) is set to "enabled", and if spatial relation information for an SRS resource (for example, a higher layer parameter, spatialRelationInfo) is not configured in FR2 excluding an SRS resource that has usage (a higher layer parameter, usage) within an SRS resource set that is set in "beam management (for example, beamManagement)" or an SRS resource that has usage within an SRS resource set that is set in a "nonCodeBook" with associated CSI-RS (for example, associatedCSI-RS) configuration, and if a path loss reference RS (for example, a higher layer parameter, pathlossReferenceRS) is not configured, the UE may follow at least one of the following procedures 1-1 and 1-2.

[Procedure 1-1]

If a default spatial relation enabler is configured, the UE may follow the following procedure 1-1-1 or 1-1-2.

[[Procedure 1-1-1]]

The UE transmits a target SRS using the same spatial domain transmission filter that is used for receiving a CORESET with the lowest CORESET ID in the latest slot in which one or more CORESETs in an active BWP of the serving cell are monitored by the UE. If the UE is not configured with any CORESET in the (SRS) CC (in an active BWP in the CC), the UE transmits a target SRS using the same spatial domain transmission filter used for receiving an activated TCI state with the lowest ID among the activated TCI states applicable to a PDSCH in the active BWP of the CC.

[[Procedure 1-1-2]]

The UE transmits a target SRS using the same spatial domain transmission filter that is used for receiving a CORESET with the lowest CORESET ID in the latest slot in which one or more CORESETs in an active BWP of the serving cell are monitored by the UE. If an SRS triggered by DCI is on another CC, the UE transmits the target SRS using the same spatial domain transmission filter used for receiving an activated TCI state with the lowest ID among the activated TCI states applicable to a PDSCH in the active BWP on the CC.

[Procedure 1-2]

Otherwise, the UE may follow the following procedure.

The UE transmits a target SRS using the same spatial domain transmission filter used for receiving a CORESET with the lowest CORESET ID in an active DL BWP in the (SRS) CC. If the UE is not configured with any CORESET in the CC (in an active BWP in the CC), the UE transmits a target SRS using the same spatial domain transmission filter used for receiving an activated TCI state with the lowest ID among the activated TCI states applicable to a PDSCH in the active BWP of the CC.

<<Mode 2-2>>

The following procedure may be specified for the default spatial relation for a PUCCH.

When the following conditions 1-1-1 to 1-1-4 are satisfied, if the following condition 1-2 is satisfied, the spatial relation (spatial setting) may follow the following procedure 1-1, and if the condition 1-2 is not satisfied, the spatial relation may follow the following procedure 1-2.

[Condition 1-1-1]

UE reports UE capability information (for example, beamCorrespondenceWithoutUL-BeamSweeping) indicating that the UE supports beam correspondence without using UL beam sweeping.

[Condition 1-1-2]

UE is not provided with a path loss reference signal (for example, pathlossReferenceRSs) in a PUCCH power control parameter (for example, PUCCH-PowerControl).

[Condition 1-1-3]

UE is provided with information indicating enablement of the default spatial relation and default PL-RS for a PUCCH (a default beam path loss enablement parameter, for example, enableDefaultBeamPlForPUCCH).

[Condition 1-1-4]

UE is not provided with PUCCH spatial relation information (PUCCH-SpatialRelationInfo).
[Condition 1-2]
A default spatial relation enabler (for example, enabler-DefaultSpatialRelation_r17) is configured.
[Procedure 1-1]
The spatial setting for PUCCH transmission from the UE is the same as the spatial setting for PDCCH reception by the UE in a CORESET with the lowest ID on an active DL BWP of a primary cell (PCell) in which the CORESET is on the latest monitoring slot.
[Procedure 1-2]
The spatial setting for PUCCH transmission from the UE is the same as the spatial setting for PDCCH reception by the UE in a CORESET with the lowest ID on an active DL BWP of the PCell.

<<Mode 2-3>>
The following procedure may be specified for the default PL-RS for a PUSCH scheduled by DCI format 0_0.
When the following conditions 1-1-1 to 1-1-3 are satisfied, if condition 1-2 is satisfied, the RS for path loss calculation for the PUSCH may follow the following procedure 1-1 and, if condition 1-2 is not satisfied, the RS for path loss calculation for the PUSCH may follow the following procedure 1-2.
[Condition 1-1-1]
A PUSCH transmission is scheduled by DCI format 0_0.
[Condition 1-1-2]
UE is not provided with a PUCCH resource for an active UL BWP.
[Condition 1-1-3]
UE is provided with information indicating enablement of the default spatial relation and default PL-RS for a PUSCH scheduled by DCI format 0_0 (a default beam path loss enablement parameter, for example, enableDefaultBeamPlForPUSCH0_0).
[Condition 1-2]
A default spatial relation enabler (for example, enabler-DefaultSpatialRelation_r17) is configured.
[Procedure 1-1]
The UE determines an RS resource index that provides an RS resource with "QCL type D" in a TCI state of a CORESET with the lowest index on the latest slot in an active DL BWP of the scheduling cell for the serving cell or in QCL assumption.
[Procedure 1-2]
The UE determines an RS resource index that provides an RS resource with "QCL type D" in a TCI state of a CORESET with the lowest index in an active DL BWP of the scheduling cell for the serving cell or in QCL assumption.

When the following conditions 2-1-1, 2-1-2, and 2-3-1 are satisfied, if the following condition 2-2 is satisfied, the UE may follow the following procedure 2-1 and, if the condition 2-2 is not satisfied, the UE may follow the following procedure 2-2.
[Condition 2-1-1]
A PUSCH transmission is scheduled by DCI format 0_0.
[Condition 2-1-2]
UE is not applied with the spatial setting for a PUCCH resource on the active UL BWP of a primary cell.
[Condition 2-1-3]
UE is provided with information indicating enablement of the default spatial relation and default PL-RS for a PUSCH scheduled by DCI format 0_0 (a default beam path loss enablement parameter, for example, enableDefaultBeamPlForPUSCH0_0).

[Condition 2-2]
A default spatial relation enabler (for example, enabler-DefaultSpatialRelation_r17) is configured.
[Procedure 2-1]
The UE determines an RS resource index that provides an RS resource with "QCL type D" in a TCI state of a CORESET with the lowest index on the latest slot in an active DL BWP of a primary cell or in QCL assumption.
[Procedure 2-2]
The UE determines an RS resource index that provides an RS resource with "QCL type D" in a TCI state of a CORESET with the lowest index in an active DL BWP of the primary cell or in QCL assumption.

<<Mode 2-4>>
The following procedure may be specified for the default PL-RS for a PUCCH.
When the following conditions 1-1-1, 1-1-2, and 1-1-3 are satisfied, if condition 1-2 is satisfied, an RS for path loss calculation for a PUCCH may follow the following procedure 1-1, and, if condition 1-2 is not satisfied, an RS for path loss calculation for a PUCCH may follow the following procedure 1-2.
[Condition 1-1-1]
UE is not provided with a path loss reference RS (for example, pathlossReferenceRSs).
[Condition 1-1-2]
UE is not provided with PUCCH spatial relation information (for example, PUCCH-SpatialRelationInfo).
[Condition 1-1-3]
UE is provided with information indicating enablement of the default spatial relation and default PL-RS for a PUCCH (a default beam path loss enablement parameter, for example, enableDefaultBeamPlForPUCCH).
[Condition 1-2]
A default spatial relation enabler (for example, enabler-DefaultSpatialRelation_r17) is configured.
[Procedure 1-1]
The UE determines an RS resource index that provides an RS resource with "QCL type D" in a TCI state of a CORESET with the lowest index on the latest slot in an active DL BWP of a primary cell or in QCL assumption.
[Procedure 1-2]
The UE determines an RS resource index that provides an RS resource with "QCL type D" in a TCI state of a CORESET with the lowest index in an active DL BWP of the primary cell or in QCL assumption.

<<Mode 2-5>>
The following procedure may be specified for the default PL-RS for an SRS.
When the following conditions 1-1-1, 1-1-2, and 1-1-3 are satisfied, if condition 1-2 is satisfied, an RS for path loss calculation for an SRS may follow the following procedure 1-1, and, if condition 1-2 is not satisfied, an RS for path loss calculation for an SRS may follow the following procedure 1-2.
[Condition 1-1-1]
UE is not provided with a path loss reference RS (for example, pathlossReferenceRS) or an SRS path loss reference RS (for example, SS-PathlossReferenceRS).
[Condition 1-1-2]
UE is not provided with spatial relation information (for example, spatialRelationInfo).
[Condition 1-1-3]
UE is provided with information indicating enablement of the default spatial relation and default PL-RS for an SRS (a default beam path loss enablement parameter, for example, enableDefaultBeamPlForSRS).

[Condition 1-2]

A default spatial relation enabler (for example, enabler-DefaultSpatialRelation_r17) is configured.

[Procedure 1-1]

In the case of cross-carrier scheduling, the UE determines an RS resource index that provides an RS resource with "QCL type D" in a TCI state of a CORESET with the lowest index in the latest slot in an active DL BWP of the (SRS) CC or in QCL assumption. Otherwise, the UE determines an RS resource index that provides an RS resource with "QCL type D" in a TCI state of a CORESET with the lowest index in the latest slot in the active DL BWP of the CC or in QCL assumption. Otherwise, the UE determines an RS resource index that provides an RS resource with "QCL type D" in an active PDSCH TCI state with the lowest ID in an active DL BWP of a scheduled CC.

[Procedure 1-2]

If a CORESET is provided in the active DL BWP, the UE determines an RS resource index that provides an RS resource with "QCL type D" in a TCI state of a CORESET with the lowest index or in QCL assumption. If no CORESET is provided in the active DL BWP, the UE determines an RS resource index that provides an RS resource with "QCL type D" in an active PDSCH TCI state with the lowest index.

According to the above-described second embodiment, the UE can appropriately determine a default spatial relation/default PL-RS of an UL signal.

Third Embodiment

In Rel. 15, the UE always supports one active TCI state for a PDSCH and two active TCI states for a PDCCH including the same active TCI state for the PDSCH. For example, the active TCI states for a PDCCH #0 and #1 and the active TCI state for a PDSCH #0 are activated.

PDSCH default TCI state/QCL changes over time. For example, the PDSCH default TCI state/QCL is TCI state #0 in slot #n and TCI state #1 in slot #n+1. Therefore, UE needs to support two active TCI states for a PDSCH that exceed the minimum UE capability.

If UE supports two active TCI states with one of the TCI states for a PDSCH, the PDSCH TCI state may follow one TCI state that is indicated in an activation command. Otherwise, the PDSCH TCI state may be determined by an existing procedure.

Even when a base station activates only one TCI state, if UE reports that it supports two active TCI states, this procedure requires a MAC CE for the PDSCH TCI state to indicate the default TCI state. If a base station is not configured with a TCI existence parameter in DCI (if the base station is not configured with the TCI existence parameter in DCI and two TCI states are activated), the base station is not required to transmit a MAC CE for the PDSCH TCI state.

In an RRC connected mode, in both cases where TCI existence information in DCI is set to "enabled" and where TCI existence information in DCI is not configured, if an offset between reception of DL DCI and the corresponding PDSCH is less than a threshold value and the UE does not receive a MAC CE indicating a TCI state for receiving a scheduled PDSCH with an offset from the reception of the corresponding DCI less than a threshold value, the UE may assume that the PDSCH DMRS port of the serving cell is quasi-co-located with an RS relating to a QCL parameter that is used for PDCCH Quasi-Co-Location indication of a CORESET with the lowest CORESET ID in the latest slot in which one or more CORESETs in an active BWP of the serving cell are monitored by the UE and in which the CORESET is associated with the monitored search space.

If the UE receives a MAC CE indicating a TCI state for receiving a scheduled PDSCH with an offset from reception of the corresponding DCI less than a threshold value, the UE acquires QCL assumption from the indicated TCI state for reception of the scheduled PDSCH.

In these two cases, if the PDSCH DMRS "QCL type D" differs from the PDCCH DMRS "QCL type D" that overlaps in at least one symbol, the UE assumes that reception of a PDCCH associated with the CORESET is prioritized. This also applies to the case of intra-band CA (when the PDSCH and the CORESET are in different CCs). If any TCI state configured for the scheduled PDSCH serving cell does not include "QCL type D", the UE acquires another QCL assumption from the indicated TCI state for the scheduled PDSCH regardless of the time offset between reception of the DL DCI and the corresponding PDSCH.

In other words, if a MAC CE is not indicated, the UE uses the default TCI state/QCL of existing Rel. 15/16. Otherwise, the UE uses the TCI state indicated by the MAC CE.

The rule for determining a default TCI state for a PDSCH may be changed.

A specific MAC CE may be indicated for each CC or may be indicated for a plurality of CCs.

For example, as shown in FIG. 6, if a specific MAC CE is not indicated, the PDSCH default TCI state/QCL may be the existing (Rel.15/16) default TCI state or the default TCI state based on the first embodiment. Otherwise, the PDSCH default TCI state/QCL may be a TCI state derived from a specific MAC CE.

The specific MAC CE may be any of the following MAC CEs 1 and 2.

<<MAC CE1>>

The specific MAC CE may be a new MAC CE that indicates the default TCI state of a PDSCH. The specific MAC CE may be any of the following MAC CEs 1-1, 1-2.

[MAC CE1-1]

The specific MAC CE can indicate one default TCI state and two default TCI states.

If a single TRP or multi-TRP-multi-DCI is configured, one default TCI state (per CORESET pool index) may be used.

If multi-TRP (multi-TRP-single-DCI) is configured, two default TCI states may be used. If multi-TRP (multi-TRP-single-DCI) is not configured, two default TCI states may not be indicated.

An RRC configuration for a new MAC CE may follow the following procedures.

The RRC parameter configures a plurality of default TCI states for PDSCH (for each PDSCH configuration (PDSCH-Config)). If no individual RRC parameter is configured, the new MAC CE activates one or two TCI states from the already configured TCI states for PDCCH or PDSCH.

The value of the default TCI state (for example, a TCI state ID) may be configured/indicated by at least one of the PDSCH configuration and MAC CE. If two values of the default TCI states are configured, the UE may select (determine) an applicable TCI state according to the value of a CORESET pool index corresponding to the scheduled PDCCH.

For example, if the configured default TCI states are TCI states #0 and #1, the UE may follow the following procedures.

For a PDSCH scheduled by DCI with a configuration where the CORESET pool index is 0, the UE may assume that the PDSCH is in TCI state #0. For a PDSCH scheduled by DCI with a configuration where the CORESET pool index is 1, the UE may assume that the PDSCH is in TCI state #1.

[MAC CE 1-2]

A specific MAC CE can indicate one default TCI state or two default TCI states.

When a single TRP or multi-TRP-multi-DCI is configured, if one default TCI state is configured (per CORESET pool index), the default TCI state may be used.

When a single TRP or multi-TRP-multi-DCI is configured, if two default TCI states are configured, the UE may follow at least one of the following procedures 1 and 2.

[[Procedure 1]]

For a single TRP, one of the two default TCI states indicated by a specific MAC CE may be used. One of the two default TCI states may be a TCI state with the lowest or highest TCI state ID, or the first or last TCI state of the two default TCI states indicated by the specific MAC CE.

[[Procedure 2]]

For multi-TRP-multi-DCI, the default TCI state may follow any of the following procedures 2-1 and 2-2.

[[Procedure 2-1]]

Two default TCI states may be indicated by a specific MAC CE for each CORESET pool index, and one of the two default TCI states may be used for each CORESET pool index. One of the two default TCI states may be similar to procedure 1.

[[Procedure 2-2]]

Two default TCI states may be indicated by a specific MAC CE for all CORESET pool indexes, and both of the two default TCI states may be used for each CORESET pool index.

When multi-TRP or single DCI is configured, a specific MAC CE may indicate two default TCI states. The two default TCI states may be indicated for all CORESETs. Both of the two default TCI states may be used for arbitrary CORESET.

For example, when the configured default TCI states are TCI states #0 and #1, the UE may follow at least one of the following examples 1, 2, and 3.

Example 1

When one default TCI state is required, the UE may select one of the configured TCI states.

Example 2

When two default TCI states are required (multi-TRP-single DCI), the UE may use both of the configured TCI states.

Example 3

If two default TCI states are required (multi-TRP-multi-DCI), the UE may use both of the configured TCI states. For a PDSCH scheduled by DCI with a configuration where the CORESET pool index is 0, the UE may assume that the PDSCH is in TCI state #0. For a PDSCH scheduled by DCI with a configuration where the CORESET pool index is 1, the UE may assume that the PDSCH is in TCI state #1.

<<MAC CE2>>

A specific MAC CE may be an existing MAC CE for a TCI state of a PDSCH on a scheduled CC.

When the specific MAC CE indicates a plurality of TCI states, the default TCI state may be an active TCI state with the lowest or highest ID among the plurality of TCI states or an active TCI state corresponding to the lowest or highest TCI codepoint among the plurality of TCI states.

When at least one of the following conditions 1 to 4 is satisfied, the UE may perform a new operation using a specific MAC CE. Otherwise, the UE may perform an existing (Rel. 15/16) operation.

[Condition 1]

A new RRC parameter (a MAC default TCI state enabler, for example, enablerMACDefaultTCIstate_r17) is configured. The new RRC parameter may be an enabler of a default TCI state based on a specific MAC CE.

[Condition 2]

UE capability corresponding to a new operation is reported.

According to the above-described third embodiment, UE can appropriately determine a default TCI state for a PDSCH.

Fourth Embodiment

When the default TCI state for a PDSCH according to the third embodiment is used in both cases of single active beam and multi-active beam, the rule for determining a default beam of a specific UL signal and the rule for determining a default beam of a specific DL signal are different. However, if one active TCI state for a PDCCH is used in non-cross-carrier scheduling, the default TCI state for the PDSCH according to the third embodiment and the default beam of UL in Rel. 16 are the same.

The rule for determining the default spatial relation/default PL-RS of a specific UL signal (PUCCH/SRS/PUSCH) may be changed, and the determination rule may be matched with the rule for determining the default beam of a specific DL signal. A new operation based on the changed determination rule may follow the following procedure.

Figure 7:
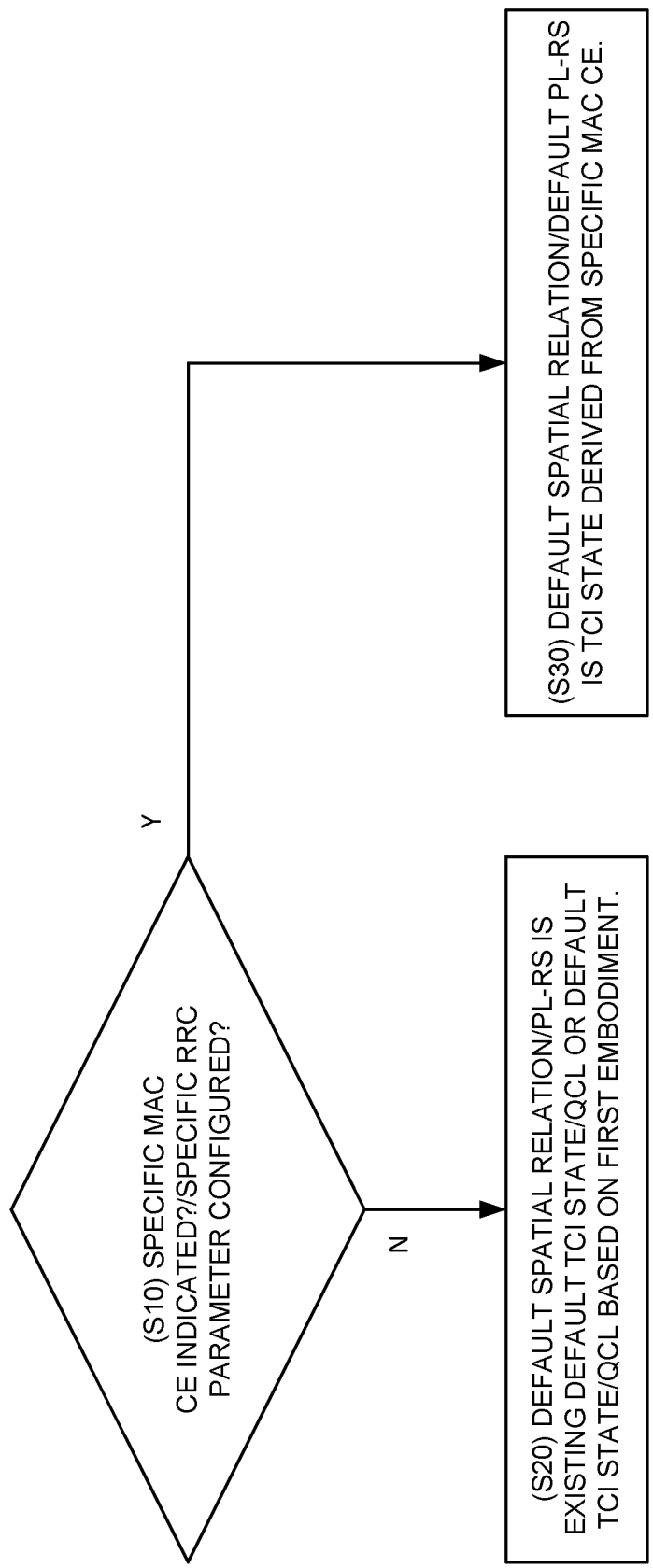
FIG. 7 is a diagram to show an example of a method for determining a UL default beam according to a fourth embodiment.

For example, as shown in FIG. 7, a specific MAC CE application condition may be at least one of indication of a specific MAC CE and indication of a specific RRC parameter. If the applicable condition is not satisfied (S10: N), the default spatial relation/default PL-RS of a specific UL signal may be an existing (Rel.15/16) default TCI state or may be a default TCI state based on the first embodiment (S20). Otherwise (S10: Y), the default spatial relation/default PL-RS of a specific UL signal may be a TCI state according to the third embodiment that is derived from the specific MAC CE (S30).

If at least one of the following conditions 1 to 4 is satisfied, the UE may perform a new operation. Otherwise, the UE may perform an existing (Rel. 15/16) operation.

[Condition 1]

A new RRC parameter (a MAC default TCI state enabler, for example, enablerMACDefaultTCIstate_r17) is configured. The new RRC parameter may be an enabler of the default TCI state based on a specific MAC CE according to the third embodiment.

[Condition 2]

A new RRC parameter (a default spatial relation enabler, for example, enablerDefaultSpatialRelation_r17) is configured. The new RRC parameter may be an enabler of a new operation of the default spatial relation/default PL-RS.

[Condition 3]

A New RRC parameter (a default spatial relation enabler, for example, enablerDefaultSpatialRelation_r17) is configured. The new RRC parameter may be an enabler of a new operation of the default spatial relation/default PL-RS that follows the default TCI state based on a specific MAC CE according to the third embodiment.
[Condition 4]
UE capability corresponding to a new operation is reported.

A specific MAC CE may be used for indication of a default TCI state. An individual MAC CE may not be required for indication of the default spatial relation/default PL-RS.

According to the above-described fourth embodiment, UE can appropriately determine a default spatial relation/default PL-RS of a specific UL signal.

Fifth Embodiment

The rule for determining a default spatial relation/default PL-RS of a specific UL signal (PUCCH/SRS/PUSCH) may be changed, and a default spatial relation/default PL-RS may be explicitly indicated to UE. A new operation based on the changed determination rule may follow the following procedure.

Figure 8:
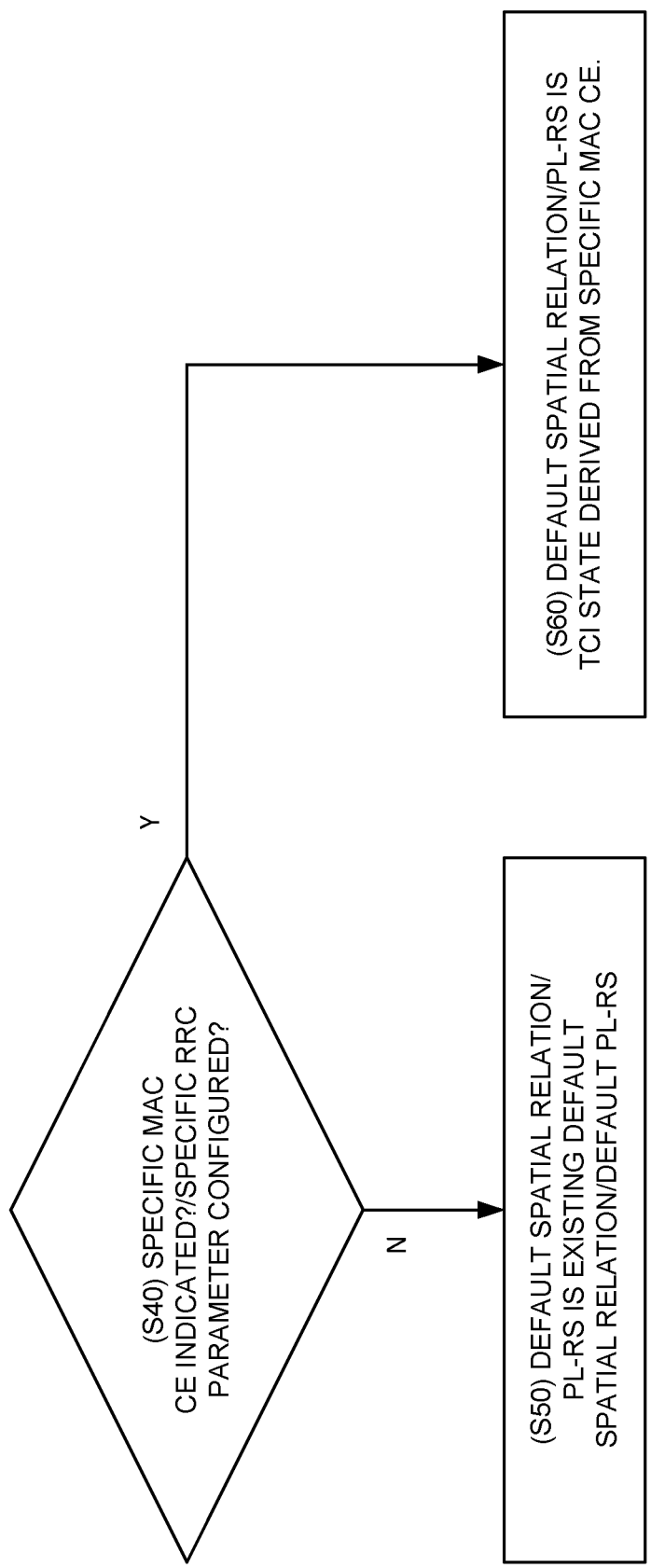
FIG. 8 is a diagram showing an example of a method for determining a UL default beam according to a fifth embodiment.

For example, as shown in FIG. 8, in at least one of a case where a specific MAC CE is not indicated and a case where a specific RRC parameter is indicated, the default spatial relation/default PL-RS of a specific UL signal may be an existing (Rel. 15/16) default spatial relation/default PL-RS (S50). Otherwise (S40: Y), the default spatial relation/default PL-RS of a specific UL signal may be derived from the specific MAC CE (S60).

If at least one of the following conditions 1 to 3 is satisfied, the UE may perform a new operation. Otherwise, the UE may perform an existing (Rel.15) operation.
[Condition 1]
A new RRC parameter (a default spatial relation enabler, for example, enablerDefaultSpatialRelation_r17) is configured. The new RRC parameter may be an enabler of a new operation of a default spatial relation/default PL-RS.
[Condition 2]
A new RRC parameter (a default spatial relation enabler, for example, enablerDefaultSpatialRelation_r17) is configured. The new RRC parameter may be an enabler of a new operation of a default spatial relation/default PL-RS that follows the default TCI state based on a specific MAC CE according to the third embodiment.
[Condition 3]
UE capability corresponding to a new operation is reported.

An individual MAC CE may be required for indication of the default spatial relation/default PL-RS. A specific MAC CE does not have to be indicated for each PUCCH/SRS resource. A specific MAC CE may indicate a default spatial relation/default PL-RS that is common to all specific UL signals (UL channels/UL-RSs).

The all specific UL signals may be part or all of SRSs, PUCCHs, PUSCHs scheduled by DCI format 0_0, and PUSCHs scheduled by DCI format 0_1.

The specific MAC CE may be any of the following MAC CEs 1 to 3.
<<MAC CE 1>>
The specific MAC CE may be a new MAC CE that indicates a default spatial relation/default PL-RS. The specific MAC CE may be any of the following MAC CEs 1-1 to 1-4.
[MAC CE 1-1]
The specific MAC CE indicates one default spatial relation/default PL-RS for all specific UL signals.
[MAC CE 1-2]

The specific MAC CE indicates one default spatial relation/default PL-RS for each specific UL signal.
[MAC CE 1-3]
The specific MAC CE indicates a plurality of default spatial relations/default PL-RSs for all specific UL signals.
[MAC CE 1-4]
The specific MAC CE indicates a plurality of default spatial relations/default PL-RSs for each specific UL signal.

When a specific MAC CE indicates a plurality of default spatial relations/default PL-RSs, the UE may select a specific index or ID (for example, the lowest or highest index) of a spatial relation/PL-RS/TCI state/QCL/SSB and use the selected RS as a default spatial relation/default PL-RS.

When a specific MAC CE indicates a plurality of default spatial relations/default PL-RSs, the UE may select a specific index or ID (for example, the lowest or highest index) of an SRS/PUCCH resource and use the selected RS as a default spatial relation/default PL-RS. The UE may select a specific index of a corresponding PUCCH resource for a PUSCH scheduled by DCI format 0_0. The UE may select a specific index of an SRS resource corresponding to an SRI for a PUSCH scheduled by DCI format 0_1.
<<MAC CE 2>>
The specific MAC CE may be an existing MAC CE that indicates a spatial relation/PL-RS. The specific MAC CE may be any of the following MAC CEs 2-1 to 2-4.
[MAC CE 2-1]
One spatial relation/PL-RS indicated by a specific MAC CE for one UL signal is applied to the default spatial relation/default PL-RS of all specific UL signals.
[MAC CE 2-2]
One spatial relation/PL-RS indicated by a specific MAC CE for a specific UL signal is applied to the default spatial relation/default PL-RS of the specific UL signal.
[MAC CE 2-3]
A plurality of spatial relations/PL-RSs indicated by a specific MAC CE for one UL signal are applied to the default spatial relations/default PL-RSs of all specific UL signals.
[MAC CE 2-4]
A plurality of spatial relations/PL-RSs indicated by a specific MAC CE for a specific UL signal are applied to the default spatial relation/default PL-RS of the specific UL signal.

When a specific MAC CE indicates a plurality of spatial relations/PL-RSs, the UE may select a specific index or ID (for example, the lowest or highest index) of the spatial relation/PL-RS/TCI state/QCL/SSB and use the selected RS as a default spatial relation/default PL-RS.

When a specific MAC CE indicates a plurality of default spatial relations/default PL-RSs, the UE may select a specific index or ID (for example, the lowest or highest index) of an SRS/PUCCH resource and use the selected RS for the default spatial relation/default PL-RS. The UE may select a specific index of a corresponding PUCCH resource for a PUSCH scheduled by DCI format 0_0. The UE may select a specific index of an SRS resource corresponding to an SRI for a PUSCH scheduled by DCI format 0_1.

In MAC CEs 2-1 and 2-3, one UL signal may be specified in the specification (for example, a PUCCH or an SRS), configured by a higher layer, or based on reported UE capability.

In MAC CEs 2-1 to 2-4, the UE may select a specific index or ID (for example, the lowest or highest index) of a spatial relation/PL-RS/TCI state/QCL/SSB and use the selected RS as one default spatial relation/default PL-RS of one UL signal or a specific UL signal.

In MAC CEs 2-1 to 2-4, the UE may select a specific index or ID (for example, the lowest or highest index) of an SRS/PUCCH resource and use the selected RS as a default spatial relation/default PL-RS of one UL signal or specific UL signal. The UE may select a specific index of a corresponding PUCCH resource for a PUSCH scheduled by DCI format 0_0. The UE may select a specific index of an SRS resource corresponding to an SRI for a PUSCH scheduled by DCI format 0_1.

<<MAC CE 3>>

The specific MAC CE may be an existing MAC CE that indicates a TCI state of a PDSCH on the CC of a specific UL signal.

When a specific MAC CE indicates a plurality of TCI states, the default spatial relation/default PL-RS of a specific UL signal may be an active TCI state with the lowest or highest ID among the plurality of TCI states or an active TCI state corresponding to the lowest or highest TCI codepoint among the plurality of TCI states.

According to the above-described fifth embodiment, UE can appropriately determine a default spatial relation/default PL-RS of a specific UL signal.

Other Embodiments

The third to fifth embodiments may be applied at least to non-cross-carrier scheduling.

For cross-carrier scheduling, at least one of the specific MAC CE (new MAC CE) and individual (dedicated) RRC parameter according to at least one of the third to fifth embodiments may be configured/indicated for each BWP/CC.

For cross-carrier scheduling, a specific MAC CE according to at least one of the third to fifth embodiments may be an existing MAC CE on a scheduled CC (the CC of a specific UL signal).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
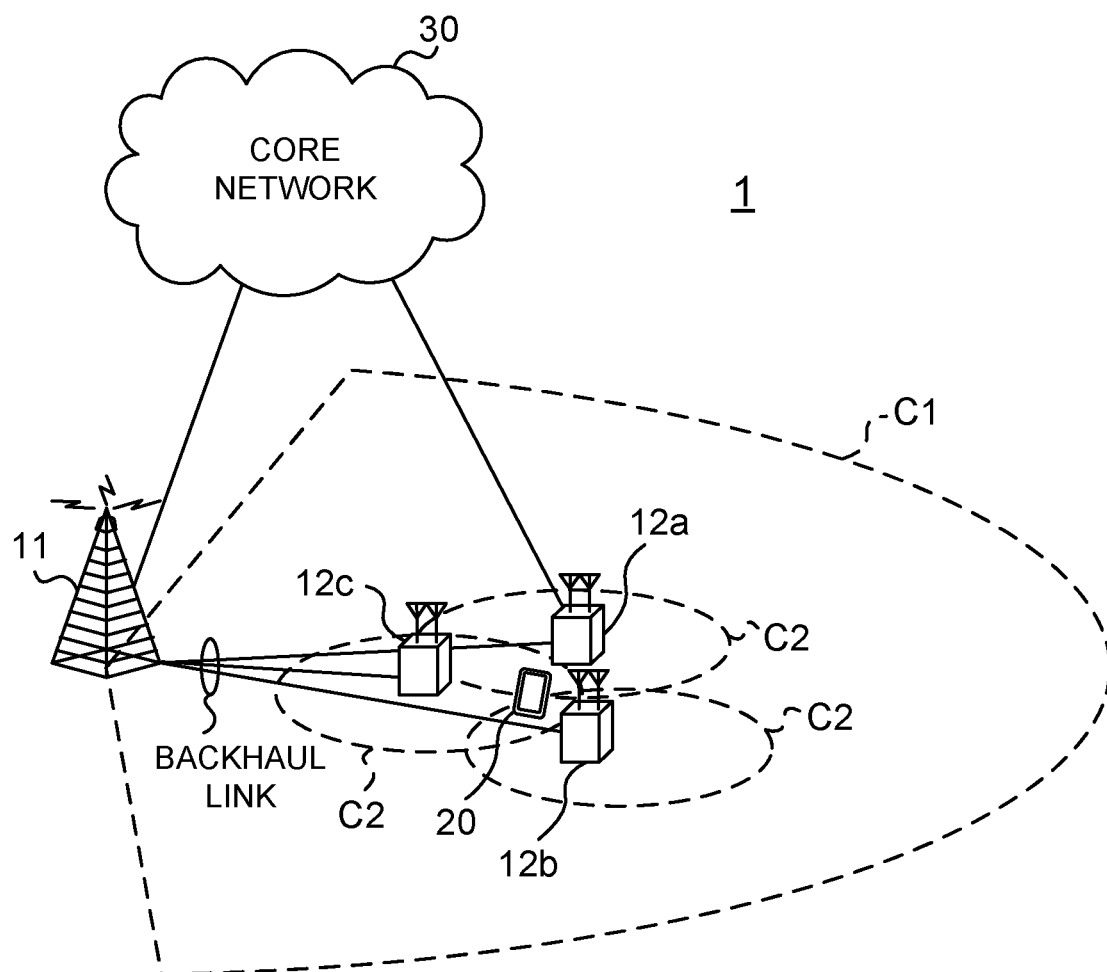
FIG. 9 is a diagram to show an example of the schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
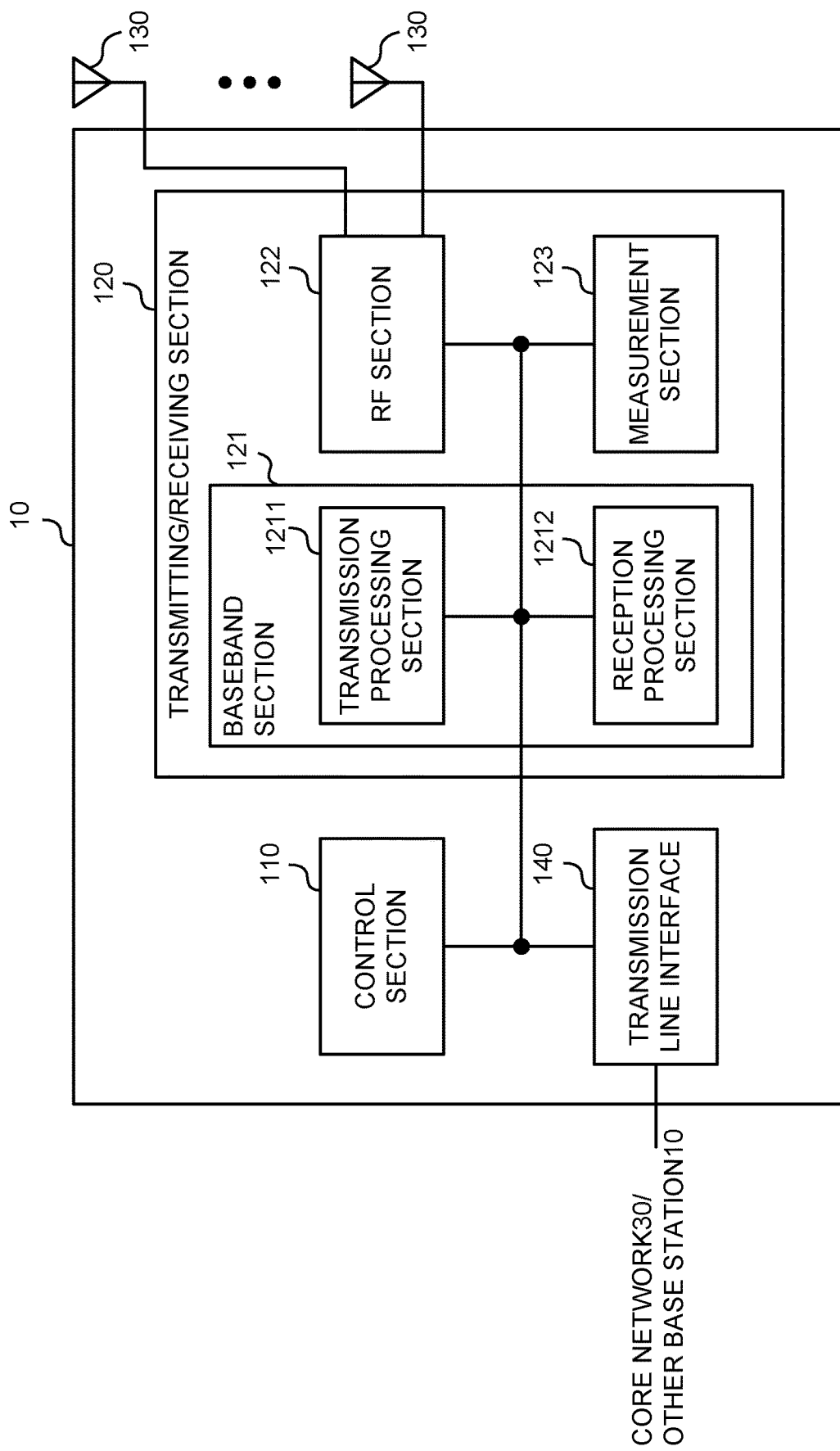
FIG. 10 is a diagram to show an example of the structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit at least one of first information relating to a physical downlink shared channel (PDSCH) and second information relating to an uplink signal. When the first information satisfies a first condition, the control section 110 may use a first QCL parameter for receiving the PDSCH instead of a Quasi-Co-Location (QCL) parameter that is indicated for the PDSCH and, when the second information satisfies a second condition, the control section 110 may use a second QCL parameter for receiving the uplink signal instead of a QCL parameter that is indicated for the uplink signal. The first QCL parameter and the second QCL parameter may be equal.

The transmitting/receiving section 120 may transmit information relating to a physical downlink shared channel (PDSCH). When the medium access control (MAC) control element (CE) is indicated and the information satisfies an applicable condition, the control section 110 may use a specific transmission configuration indication (TCI) state based on the MAC CE for transmitting the PDSCH instead of a TCI state indicated for the PDSCH.

The transmitting/receiving section 120 may transmit information relating to an uplink signal. When the medium access control (MAC) control element (CE) is indicated and the information satisfies an applicable condition, the control section 110 may use a specific spatial relation based on the MAC CE for receiving the uplink signal instead of a spatial relation indicated for the uplink signal.

(User Terminal)

Figure 11:
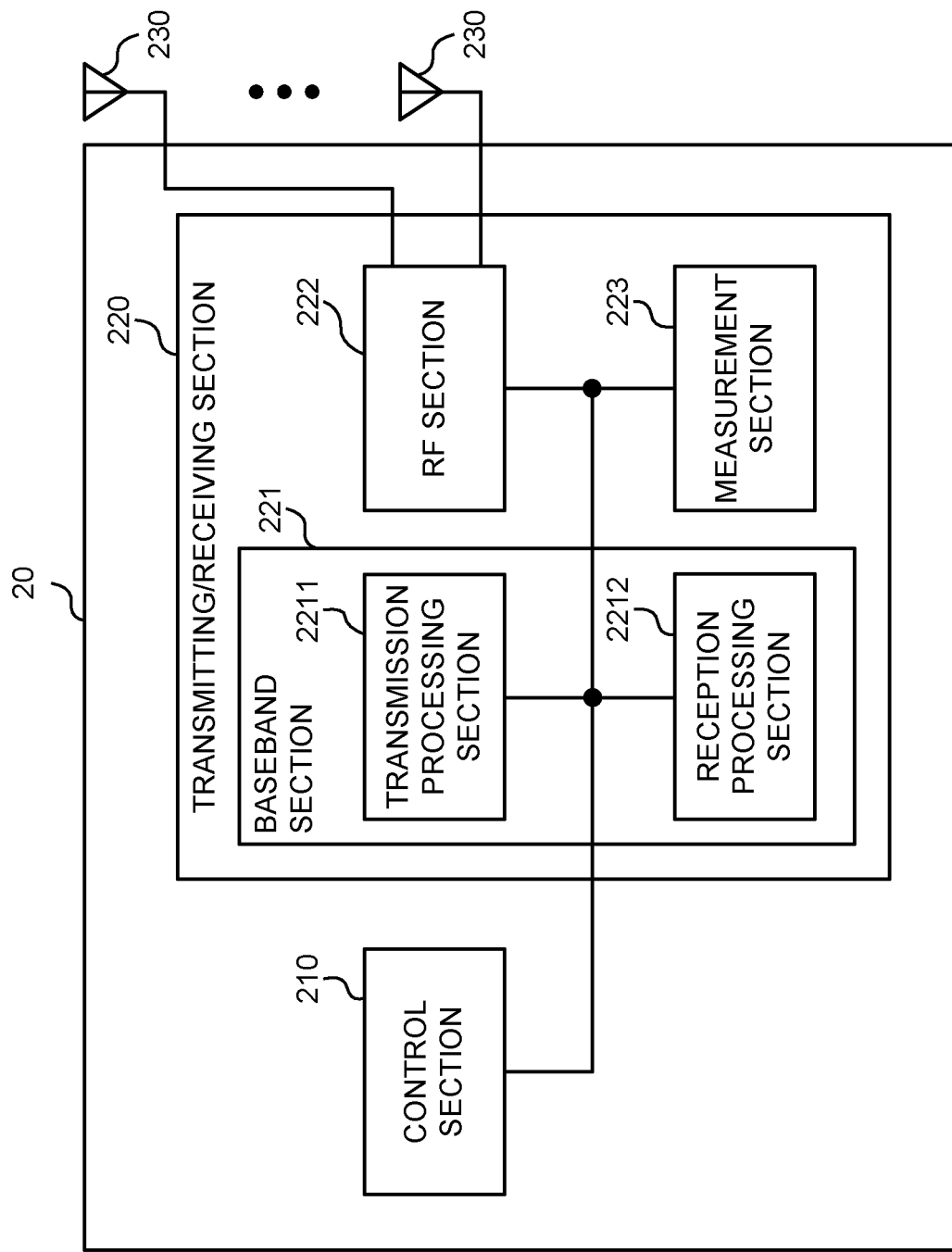
FIG. 11 is a diagram to show an example of the structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive at least one of first information relating to a physical downlink shared channel (PDSCH) and second information relating to an uplink signal. When the first information satisfies a first condition, the control section 210 may use a first Quasi-Co-Location (QCL) parameter for receiving the PDSCH instead of a QCL parameter indicated for the PDSCH and, when the second information satisfies a second condition, the control section 210 may use a second QCL parameter for transmitting the uplink signal instead of a QCL parameter indicated for the uplink signal. The first QCL parameter and the second QCL parameter may be equal (first embodiment, second embodiment).

When the terminal is configured to enable at least one of the first QCL parameter or the second QCL parameter or when the terminal reports support for at least one of the first QCL parameter and the second QCL parameter, the control section 210 may use at least one of the first QCL parameter and the second QCL parameter.

When at least one control resource set is configured for an active downlink bandwidth part (BWP), the first QCL parameter may be a transmission configuration indication (TCI) state of a control resource set with the lowest ID.

When the uplink signal is not cross-carrier scheduled, the second QCL parameter may be a transmission configuration indication (TCI) state of a control resource set with the lowest ID in the latest slot in an active downlink bandwidth part (BWP).

The transmitting/receiving section 220 may receive information relating to a physical downlink shared channel (PDSCH). When the medium access control (MAC) control element (CE) is indicated and the information satisfies an applicable condition, the control section 210 may use a specific transmission configuration indication (TCI) state based on the MAC CE for receiving the PDSCH instead of a TCI state indicated for the PDSCH (third embodiment).

When the MAC CE is not indicated, the specific TCI state may be a TCI state of a control resource set with the lowest ID or a TCI state of an active TCI state with the lowest ID for the PDSCH.

The MAC CE may indicate one TCI state or two TCI states.

The MAC CE may indicate a TCI state for the PDSCH on a scheduled cell.

The transmitting/receiving section 220 may receive information relating to an uplink signal. When the medium access control (MAC) control element (CE) is indicated and the information satisfies an applicable condition, the control section 210 may use a specific spatial relation based on the MAC CE for transmitting the uplink signal instead of a spatial relation indicated for the uplink signal (fourth embodiment, fifth embodiment).

When the terminal 20 is configured to enable the MAC CE or when the terminal 20 reports support for the MAC CE, the receiving section 220 may receive the MAC CE.

When the MAC CE is not indicated, the specific spatial relation may depend on whether the uplink signal is cross-carrier scheduled or not.

When the MAC CE is not indicated, the specific spatial relation may depend on whether a control resource set is configured for an active downlink bandwidth part (BWP) in a cell for the uplink signal or not.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
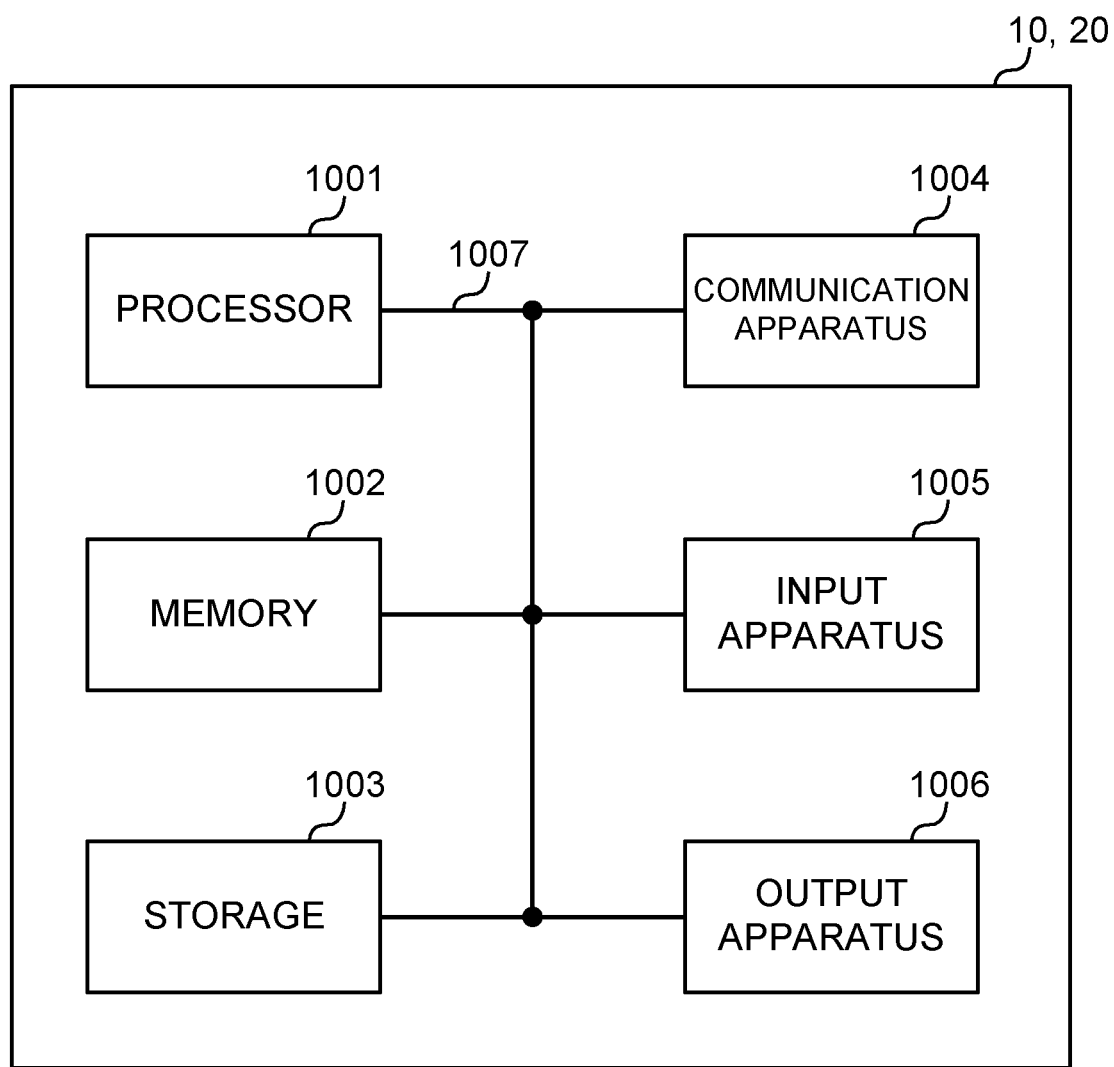
FIG. 12 is a diagram to show an example of the hardware structure of a base station and a user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives downlink control information scheduling a physical downlink shared channel; and
a processor that, in response to a time offset between the downlink control information and the physical downlink shared channel being less than a threshold and a certain radio resource control (RRC) information element being not configured, matches a transmission configuration indication (TCI) state of the physical downlink shared channel with a first TCI state of a control resource set with a lowest ID in latest slot in an active downlink bandwidth part,
wherein in response to the time offset being less than the threshold and the certain RRC information element being configured, the processor matches the TCI state of the physical downlink shared channel with a second TCI state of uplink.

2. The terminal according to claim 1, wherein the processor reports capability information indicating support of the certain RRC information element.

3. The terminal according to claim 1, wherein in response to the certain RRC information element being configured, medium access control (MAC) control element (CE) indicating the TCI state for multiple component carriers (CCs) being received, and the time offset being less than the threshold, the processor applies the TCI state to reception of physical downlink shared channels in all the multiple CCs.

4. The terminal according to claim 2, wherein in response to the certain RRC information element being configured, medium access control (MAC) control element (CE) indicating the TCI state for multiple component carriers (CCs) being received, and the time offset being less than the threshold, the processor applies the TCI state to reception of physical downlink shared channels in all the multiple CCs.

5. A radio communication method for a terminal, comprising:
receiving downlink control information scheduling a physical downlink shared channel; and
in response to a time offset between the downlink control information and the physical downlink shared channel being less than a threshold and a certain radio resource control (RRC) information element being not configured, matching a transmission configuration indication (TCI) state of the physical downlink shared channel with a first TCI state of a control resource set with a lowest ID in latest slot in an active downlink bandwidth part,
wherein in response to the time offset being less than the threshold and the certain RRC information element being configured, matching the TCI state of the physical downlink shared channel with a second TCI state of uplink.

6. A base station comprising:
a transmitter that transmits downlink control information scheduling a physical downlink shared channel; and
a processor that, in response to a time offset between the downlink control information and the physical downlink shared channel being less than a threshold and a certain radio resource control (RRC) information element being not configured, matches a transmission configuration indication (TCI) state of the physical downlink shared channel with a first TCI state of a control resource set with a lowest ID in latest slot in an active downlink bandwidth part,
wherein in response to the time offset being less than the threshold and the certain RRC information element being configured, the processor matches the TCI state of the physical downlink shared channel with a second TCI state of uplink.

7. A system comprising a terminal and a base station, wherein
the terminal comprises:
a receiver that receives downlink control information scheduling a physical downlink shared channel; and
a processor that, in response to a time offset between the downlink control information and the physical downlink shared channel being less than a threshold and a certain radio resource control (RRC) information element being not configured, matches a transmission configuration indication (TCI) state of the physical downlink shared channel with a first TCI state of a control resource set with a lowest ID in latest slot in an active downlink bandwidth part,
wherein in response to the time offset being less than the threshold and the certain RRC information element being configured, the processor matches the TCI state of the physical downlink shared channel with a second TCI state of uplink, and the base station transmits the downlink control information.

\* \* \* \* \*